US010671430B2

(12) United States Patent
Steffen et al.

(10) Patent No.: US 10,671,430 B2
(45) Date of Patent: Jun. 2, 2020

(54) EXECUTION PRIORITY MANAGEMENT FOR INTER-PROCESS COMMUNICATION

(71) Applicant: Apple Inc., Cupertino, CA (US)

(72) Inventors: Daniel A. Steffen, San Francisco, CA (US); Jainam A. Shah, San Jose, CA (US); James M. Magee, Orlando, FL (US); Jeremy C. Andrus, Sunnyvale, CA (US); Russell A. Blaine, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 124 days.

(21) Appl. No.: 15/836,411

(22) Filed: Dec. 8, 2017

(65) Prior Publication Data

US 2018/0349181 A1 Dec. 6, 2018

Related U.S. Application Data

(60) Provisional application No. 62/514,916, filed on Jun. 4, 2017.

(51) Int. Cl.
*G06F 9/48* (2006.01)
*G06F 9/52* (2006.01)
*G06F 9/54* (2006.01)

(52) U.S. Cl.
CPC .............. *G06F 9/4881* (2013.01); *G06F 9/52* (2013.01); *G06F 9/54* (2013.01)

(58) Field of Classification Search
None
See application file for complete search history.

(56) References Cited

U.S. PATENT DOCUMENTS

| | | | |
|---|---|---|---|
| 2005/0073716 A1* | 4/2005 | Maki | G06Q 10/10 358/1.15 |
| 2012/0117404 A1* | 5/2012 | Lorch | G06F 1/3228 713/323 |
| 2012/0185866 A1* | 7/2012 | Couvee | G06F 9/5044 718/104 |

(Continued)

OTHER PUBLICATIONS

Jonathan Lemon, "Kqueue: A generic and scalable event notification facility," Proceedings of the FREENIX Track: 2001 USENIX Annual Technical Conference, 141-153.

*Primary Examiner* — Wynuel S Aquino
(74) *Attorney, Agent, or Firm* — Kowert, Hood, Munyon, Rankin & Goetzel, P.C.

(57) ABSTRACT

Techniques are disclosed relating to inter-process communication. In some embodiments, a kernel receives a notification of a communication to be sent from a first thread of a first application to a second thread of a second application. The kernel provides a reply port to the first thread for receiving a reply to the communication from the second thread. The kernel facilitates sending the communication from the first thread to the second thread. The kernel increases an execution priority of the second thread in response to the kernel determining that the reply port and a destination port associated with the second thread are identified in the communication. In some embodiments, the kernel creates the reply port in response to receiving the notification and, in response to detecting the reply has been communicated to the reply port, decreases the execution priority of the second thread and removes the reply port.

20 Claims, 15 Drawing Sheets

(56) References Cited

U.S. PATENT DOCUMENTS

| | | | |
|---|---|---|---|
| 2013/0339494 A1* | 12/2013 | Mithyantha | G06F 15/177 |
| | | | 709/220 |
| 2014/0277922 A1* | 9/2014 | Chinnadurai | G07C 5/0808 |
| | | | 701/33.2 |
| 2015/0169345 A1* | 6/2015 | DeCusatis | G06F 9/45545 |
| | | | 718/1 |
| 2015/0347743 A1 | 12/2015 | Magee et al. | |
| 2016/0048406 A1* | 2/2016 | Cucinotta | G06F 9/4881 |
| | | | 718/1 |
| 2017/0163575 A1* | 6/2017 | Wang | H04L 49/9094 |
| 2017/0272792 A1* | 9/2017 | Bachmutsky | H04N 21/2181 |

* cited by examiner

EXECUTION PRIORITY MANAGEMENT FOR INTER-PROCESS COMMUNICATION

This application claims the benefit of U.S. Prov. Appl. No. 62/514,916 filed on Jun. 4, 2017, which is incorporated by reference herein in its entirety.

BACKGROUND

Technical Field

This disclosure relates generally to computer systems, and, more specifically, to operating systems that support inter-process communication.

Description of the Related Art

Modern computer systems typically include one or more processors having multiple execution cores, which may also have multiple execution pipelines. The inclusion of multiple pipelines in a processor may allow a computer system to execute multiple instruction sequences in parallel in order to perform multiple tasks concurrently. To allow application developers to use this functionality, a modern operating system may provide an application programming interface (API) that allows an application to make various system calls to the operating system to request the use of this functionality. For example, in Linux and Berkeley Software Distribution (BSD) operating systems, an application may include a "fork" system call to request that an operating system kernel spawn an additional thread to perform one or more tasks concurrently with tasks being performed by a main thread of the application. In order to manage scheduling of multiple threads, an operating system may assign different execution priorities to threads—giving preferential scheduling to higher priority threads.

Modern operating systems also may implement an inter-process communication system to facilitate sending and receiving messages between applications (as well as processes/threads within an application). In sending a message, a first thread may issue a request to an operating system kernel to cause it to route a message through the operating system kernel to a second recipient thread. If the second thread wants to respond, it may make a similar request to route a response back to the first thread. This system may also be used to notify a thread when particular events occur within the computer system, so that the thread can take appropriate action. For example, if a thread is wanting to open a particular file being accessed by some other thread, the thread may request that the operating system kernel notify it when the other thread has closed the file making it available for access.

Figure 1:
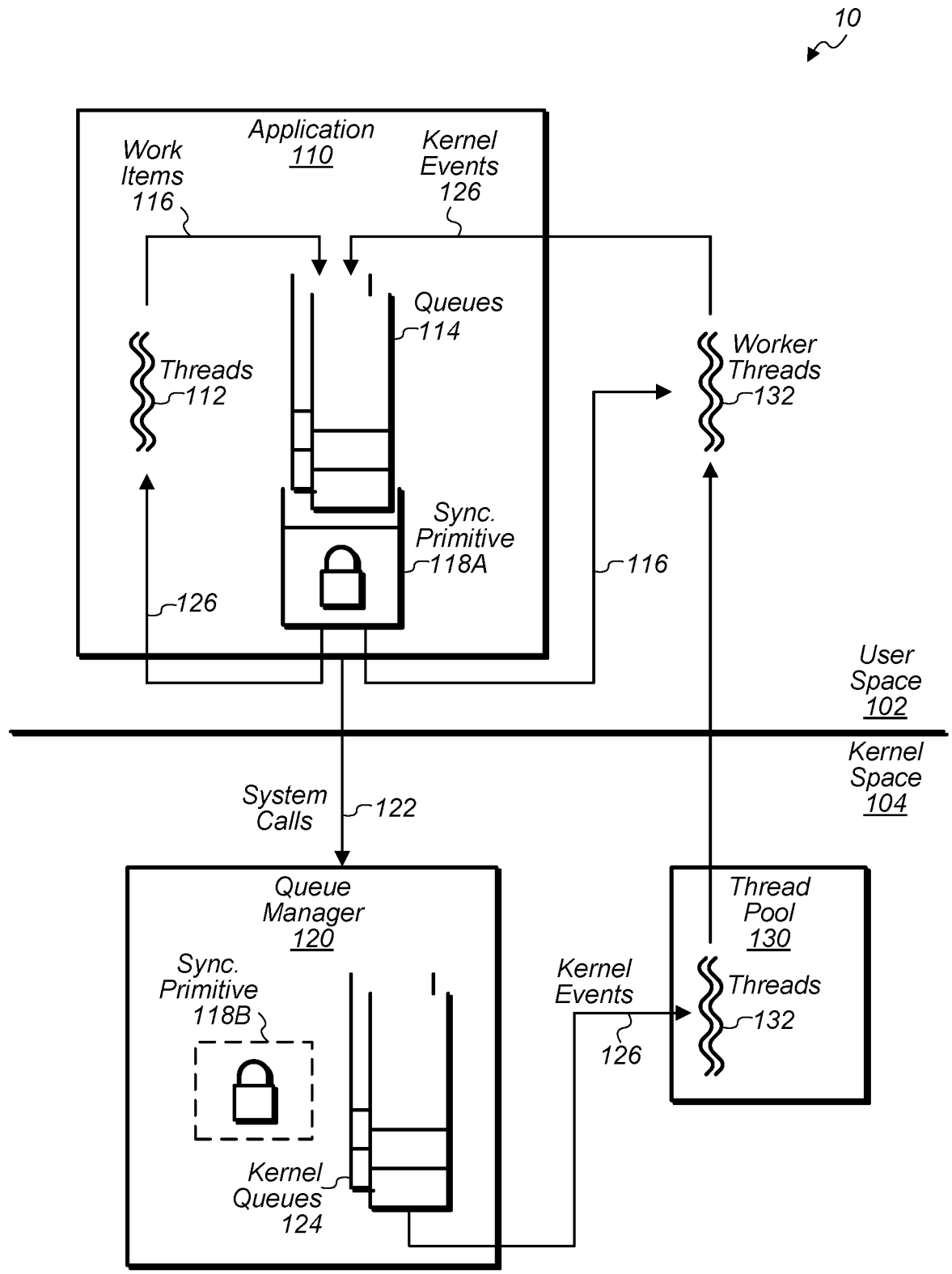
FIG. 1 is a block diagram illustrating an example of a multi-threaded computer system that uses queues to pass work items to an operating system kernel and to receive notifications of events from the operating system kernel.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "processor configured to execute program instructions of an application" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a processor having eight processing cores, the terms "first" and "second" processing cores can be used to refer to any two of the eight processing cores. In other words, the "first" and "second" processing cores are not limited to logical processing cores 0 and 1, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

In many instances, an inter-process communication system may be used by one application to send a request to another application to ask that it perform some action and provide a result back to the application. In some instances, the application thread sending the message to make the request may suspend execution (i.e., block) awaiting the return of the result. For example, an email application may include a thread that generates a user interface depicting the content of one or more emails in a user's inbox. Rather than read the email content from memory, the thread may send an IPC to another application (e.g., a daemon) that can provide one or more threads to read the email contents. Since the thread generating the user interface cannot present the email content before it is read from memory, the thread may block until it receives the email content from the other application.

Although a thread may be assigned a high execution priority, it may be blocked awaiting a response from another thread assigned a lower priority. (As used herein, the term "execution priority" is to be interpreted according to its understood meaning in the art, and includes a value assigned to a process/thread that controls how frequently and/or how long the process/thread is scheduled for execution. For example, an execution priority in Unix™-based systems may correspond to a priority value (PR) and/or niceness value (NI).) Being held up awaiting a response, the thread's execution priority is effectively lowered as the requested work is being performed by the other thread executing at the lower priority. While elevating the execution priority of the lower-priority thread can mitigate this issue, it is important to ensure that this thread does not continue to execute at the elevated priority indefinitely as the thread could potentially starve more important threads. It is also important to ensure that control over the execution priority is maintained even if the thread malfunctions and/or attempts to share the execution priority with other threads.

The present disclosure describes techniques for temporarily adjusting an execution priority for a thread that services IPC requests. As will be described in greater detail below, in various embodiments, a higher-priority application thread intending to request the services of another thread may notify an operating system kernel and receive a reply port for receiving a reply to the request. The kernel may associate the reply port with the high-priority thread (and more specifically its execution priority) such that the kernel elevates the execution priority of other thread (e.g., to the execution priority of the high-priority thread) in response to identifying a request directed to the other thread and specifying the reply port to be used for the reply. In other words, the presence of the reply port in the communicated request allows the kernel to know that this request is the one associated with the earlier notification. When the other thread receives the request, it may be able to more quickly process the request and produce a reply because it is executing at the elevated priority. In various embodiments, when the other thread sends a reply back to the high-priority thread, it sends the reply via the reply port included in the earlier request. The kernel may then detect that the reply is being sent via the reply port and return the other thread to its previous, lower execution priority. By tying elevation of the execution priority to the reply port, the kernel may ensure that the other thread does not continue to execute at the elevated priority once the reply has been sent. As will also be discussed, in various embodiments, the kernel may also identify which thread is to receive the elevated execution priority prior to the request being received based on the request specifying a destination port associated with the thread intended to receive the elevated execution priority. In some embodiments, this identification may leverage the use of synchronization primitives that control access to queues used to send and receive IPC communications.

Before discussing management of execution priorities in more detail, an overview of a computing system configured to use synchronization primitives to facilitate performance of work items and exchange of messages is described in conjunction with FIGS. 1-6C. Execution priority management within the context of IPCs is described in further detail in conjunction with FIGS. 7A-9C. An exemplary computer system, which may be used in accordance with the techniques described herein, is lastly presented in conjunction with FIG. 10.

Synchronization Primitives

While using multiple threads can provide significant performance improvements for an application, traditional multi-threading techniques do have some potential downsides. Spawning threads (e.g., using a fork system call) can have enough overhead to easy mitigate any benefits if the tasks being performed by the new threads are small ones. In order to correctly use threads, application developers may need to understand system calls and understand proper thread management such as remembering to kill threads after they are no longer being used. Still further, using multiple threads may further complicate delivery of messages (e.g., regarding inter-process communications or occurrences of other events) to an application as messages may need to be routed to the appropriate application threads executable to process them. One approach involved an application maintaining a dedicated thread for receiving messages and delivering messages to the appropriate application threads; however, maintaining a thread solely for this purpose is an inefficient use of system resources—particularly when each application on a computer system may have such a thread.

The present disclosure describes techniques for improving usage of multiple threads by, for example, reducing the overhead associated with using multiple threads as well as reducing the overhead associated with delivering notifications to an application. As will be described in greater detail below, in various embodiments, an operating system kernel can maintain a collection of already spawned threads (referred to below as a "thread pool") that can be dispatched to executing applications to assist in the performance of various work items. Notably, once a dispatched thread has assisted an application with performance of a requested work item, the thread can return to the thread pool, so that it can later be dispatched to another application. An advantage of dispatching threads in this manner is that a thread does not have to be recreated for every work item, and thus incur the overhead of recreation. Dispatched threads may also handle delivery of notifications/messages (referred to below as "kernel events") regarding the occurrences of various events such as the arrival of an inter-process communication.

In order to facilitate delivery of work items and kernel events, in various embodiments, an application instantiates a collection of queues to receive work items and kernel events for processing. Accordingly, if a thread of an application wants to have a work item processed, the thread can enqueue the work item in the collection of queues and have the kernel dispatch a thread from the thread pool (as opposed to spawning a child thread to handle the item, which, again, would involve additional overhead). The dispatched thread may then dequeue the work item and process it. Similarly, a dispatched thread delivering a kernel event may enqueue it in the collection of queues, and an application thread may subsequently dequeue the kernel event for processing. Such a delivery scheme may be advantageous over the prior delivery approach noted above as a dedicated kernel-event processing thread does not need to be maintained, freeing up additional resources.

As application threads and dispatched threads may simultaneously compete to enqueue and/or dequeue work items and kernel events, in various embodiments, a synchronization primitive is instantiated to control access to the collection of queues. As used herein, the term "synchronization primitive" is to be interpreted according to its understood meaning in the art, and includes a data structure that controls access to a resource in a manner that ensures mutual exclusion such as a semaphore, mutex, lock, etc. In various embodiments, the synchronization primitive is operable to, not only control access to a collection of queues, but also store various metadata about enqueue items, which is useful to the kernel as well as dispatched threads. For example, in some embodiments, the synchronization primitive may store an execution priority associated with an enqueued item to indicate that the kernel is supposed to dispatch a thread at that execution priority to perform the work item. In some embodiments, the kernel is unable to directly access the synchronization primitive; however, information stored in the synchronization primitive may be exposed via one or more system calls to the kernel, which may instantiate a data structure corresponding to the synchronization primitive for storing this conveyed information. For example, this data structure may include the priority of an enqueued item. In various embodiments, the kernel stores additional information in this structure that may be helpful for dispatching threads. For example, in some embodiments, this additional information may include an identifier for any dispatched thread, which is associated with the synchronization primitive (or more generally the collection of queues). If the kernel receives a system call from an application requesting a thread to handle a newly enqueued work item, the kernel may determine from this identifier that a thread has already been dispatched to operate on an earlier enqueued item in the collection of queues and can operate on this newly enqueued item (or may determine to delay dispatching another thread until the previously dispatched thread returns to the thread pool). As a result, the number of times a thread gets dispatched and/or the frequency of dispatching threads may be reduced.

Turning now to FIG. 1, a block diagram of a computer system 10 configured to execute multiple threads is depicted. In the illustrated embodiment, system 10 includes an application 110, queue manager 120, and thread pool 130. Application 110 includes one or more application threads 112, queues 114, and a synchronization primitive 118A. Queue manager 120 includes a synchronization primitive 118B and kernel queues 124. Thread pool 130 includes worker threads 132. In some embodiments, system 10 may be implemented different than shown. For example, system 10 may include multiple applications 110, each application 110 may include multiple collections of queues 114, each controlled by a primitive 118A, etc.

As shown, in various embodiments, application 110 resides in user space 102 while queue manager 120 and thread pool 130 reside in kernel space 104. As used herein, a "user space" (or application space) refers to a classification of applications (i.e., processes) that execute with restricted privileges (e.g., restricted access to files, addresses, hardware, etc.) and typically includes applications that are not responsible for management of the computer system. Examples of user-space applications may include, for example, word processing applications, web browsers, mail clients, etc. For security reasons, most applications typically run as user-space applications. The term "user space" can also refer to a region (or regions) of memory allocated to a user-space application for storage of its program instructions and application data. In many instances, a user-space application 110 may be restricted to accessing only data within a user-space region of memory. In contrast, "kernel space" (or system space) refers to a classification of applications that execute with unrestricted privileges and typically includes applications responsible for system management. Examples of kernel-space applications may include an operating system kernel, drivers, a hypervisor, etc. "Kernel space" can also refer to restricted regions of memory that can only be accessed by kernel-space applications. In some embodiments, kernel-space applications may also be restricted from accessing user-space regions of memory. Restricting applications 110 in this manner may provide additional security as it can prevent a malicious (or malfunctioning) application from executing with the full set of privileges given to, for example, the operating system kernel. It can also prevent kernel-space applications from being compromised by causing them to run user-space program instructions.

Application 110, in various embodiments, is a multi-threaded application and may correspond to any suitable application such as those mentioned above. Being a multi-threaded application, application 110 may spawn multiple threads 112 to perform multiple actions concurrently. For example, if application 110 is a mail client, application 110 may have a main thread 112 for managing the user interface and spawn another thread 112 for retrieving email from a mail server concurrently. As an alternative to spawning an additional thread 112 to perform some action, in various embodiments, an application 110 may offload the work (shown as a work item 116) to a worker thread 132 for performance. As used herein, the term "work item" refers generally to a set of instructions for performing some action. For example, a mail client may present multiple panels, each showing a respective portion of a received email in a user's inbox. Rather than spawn multiple threads 112 to read each email portion, the mail client may provide a work item 116 for each panel to cause one or more worker threads 132 to perform reading the email portions from memory. Application 110 may also want to receive notifications (shown as kernel events 126) from the kernel when particular events occur. For example, a mail application may want to know when a push notification has been received from a mail server indicating that new mail is available for retrieval. As will be discussed below, in various embodiments, a worker thread 132 may be dispatched to deliver such a kernel event 126 in response to, for example, a network interface card of system 10 receiving traffic via a particular TCP/IP port associated with the push notification. Kernel events 126 may also be used to deliver inter-process communications such as a request from another application to open a window for a user to compose an email because the user clicked an email address in the other application.

Queues 114 may be instantiated by an application 110 to facilitate the exchange of work items 116 and kernel events 126 between threads 112 and 132. Accordingly, if an application thread 112 wants to offload a work item to a worker thread 132, the thread 112 may enqueue it in a queue 114, and a work thread 132 may subsequently retrieve the work item 116 from a queue 114 to perform the work item 116. In some embodiments, work items 116 may be enqueued asynchronously or synchronously. In asynchronous enqueuing, a thread 112 delivers a work item 116 and continues to execute while the work item 116 is being performed. In synchronous enqueuing, a thread 112 delivers a work item 116 and blocks (i.e., suspends execution) while the work item 116 is being performed. Similarly, if the kernel wants to deliver a kernel event 126 via a worker thread 132, the thread 132 may enqueue the event 126 in a queue 114 until the appropriate thread 112 can dequeue it and use it. In some embodiments, work items 116 and events 126 are assigned one of multiple execution priorities in order to ensure that a particular quality of service (QoS) is achieved when processing the item 116 or event 126. For example, a time-sensitive work item 116 associated with rendering a user interface may be assigned a higher execution priority than an execution priority of a kernel event 126 indicating that new email is available for retrieval. In such an embodiment, queues 114 may be priority queues that select items 116 and events 126 based on their assigned priorities—giving favoritism to higher priorities. In some embodiments, an application 110 may instantiate a single queue 114, a collection of queues 114, or (as discussed below with respect to FIG. 2) a collection of queues 114 arranged in a manner that collectively implement a queue. In some embodiments, queues 114 are operable such that only a single item 116 or event 126 can be enqueued or dequeued at a given time by a thread 112 or 132. In another embodiment, queues 114 may permit multiple items 116 and events 126 to be enqueued at a given time, but not multiple items 116 and events 126 to be dequeued at a given time.

Synchronization primitive 118A, in various embodiments, is a data structure operable to control access to queues 114 by threads 112 and 132. In some embodiments, this access control includes ensuring mutual exclusion for threads 112 and 132 dequeuing and potentially executing content of queues 114. Accordingly, if a worker thread 132 wants to dequeue a work item 116, it may acquire primitive 118A in order to ensure that no other thread dequeues the work item 116 and also executes that item 116. As will be discussed below, if another thread 112 or 132 wants to acquire primitive 118A, but it is already held by another thread (i.e., primitive 118A is contented), the other thread may wait if it has a lower execution priority and cause the original holder to be overridden. As used herein, the term "override" refers to elevating the execution priority of the thread holding a primitive in order to expedite its serving of a queue and releasing of a primitive. In some embodiments, however, primitive 118A does not control access for enqueuing work items 116 or kernel events 126. In such an embodiment, queues 114 may be operable to support simultaneous enqueuing of work items and/or kernel events 126. For example, in one embodiment, queues 114 may implement an atomic FIFO queue as discussed in U.S. application Ser. No. 12/477,767. (In other embodiments, however, primitive 118A may be acquired to enqueue items 116 and/or events 126.) In some embodiments, primitive 118A may also be acquired to ensure mutual exclusion of queues 114 when no enqueuing or dequeuing is performed. In some embodiments, instantiation of queues 114 and/or primitive 118A may be performed by application 110 via an application programming interface (API) accessible to application 110.

As noted above, in various embodiments, synchronization primitive 118A also stores useful metadata pertaining to the work items 116 and kernel events 126 enqueued in queues 114—thus primitive 118A may be said to provide uses other than merely controlling access to queues 114. As will be discussed below and in greater detail with FIG. 3, this metadata may include priority information associated with enqueued items, information about an owner thread or threads waiting to acquire primitive 118A, etc. As noted above, in some embodiments, at least a portion of this useful metadata may be conveyed to the kernel via one or more system calls 122 as primitive 118A may not be directly accessible by processes in kernel space 104. These system calls 122 may be made by an application thread 112 when items 116 are enqueued (e.g., to request a worker thread 132) or when events 126 are dequeued. Calls 122 may then be handled, in the illustrated embodiment, by queue manager 120.

Queue manager 120, in various embodiments, is a set of program instructions that are included in an operating system kernel and are executable to manage queues 114. (Thus, while various operations may be described herein as being performed by manager 120, these operations may also be described more generally as being performed by an operating system kernel.) As part of this management, queue manager 120 may receive system calls 122 requesting performance of newly enqueued work items 116 and dispatch threads 132 from thread pool 130 to service those requests. Queue manager 120 may also receive systems calls 122 from an application 110 to register for the reception of particular kernel events 126. Manager 120 may then dispatch threads 132 from thread pool 130 to deliver those events 126 as events occur in system 10. In the illustrated embodiment, manager 120 maintains kernel queues 124 to store kernel events 126 for an application 110 until the events 126 can be delivered by dispatched worker threads 132. For example, if an application 110 has registered to receive a kernel event 126 indicating when a particular file has become available for access, manager 120 may enqueue a kernel event 126 in a queue 124 in response to the kernel determining that the file has become available. Manager 120 may then instruct thread pool 130 to dispatch a worker thread 132 to deliver the event 126. In some embodiments, kernel queues 124 and kernel events 126 correspond to BSD kqueues and kevents, respectively.

Thread pool 130, in various embodiments, is a collection of worker threads 132 that can be dispatched from kernel space 104 to user space 102 to assist applications 110. As discussed above, in various embodiments, worker threads 132 from pool 130 may be shared among multiple applications 110 and dispatched to perform enqueued work items 116 and to deliver kernel events 126 from kernel queues 124. Threads 132 may be described as "ephemeral threads" as they may move up to user space 102 temporarily before returning to kernel space 104 to prepare for subsequent dispatches. In some embodiments, a thread 132 may be dispatched for some initial purpose (e.g., delivery of an event 126 or performance of an item 116), but determine after being dispatched that queues 124 have additional events 126 received in the interim or that queues 114 have received additional work items 116. In response to making such a determination, a worker thread 132 may remain in user space 102 to deliver these additional events 126 and/or process these additional work items 116. In various embodiments, threads 132 may be dispatched at higher or lower execution priorities depending on the execution priorities associated work items 116 or kernel events 126. In some embodiments, queue manager 120 may cause a thread 132 to be dispatched a first execution priority associated with an element 116 or 126 and then cause the execution priority to be changed to a second execution priority if the thread is going process some other element 116 or 126 associated with a different execution priority.

As noted above, in various embodiments, queue manager 120 may not be able to directly access primitive 118A, but may receive information included in primitive 118A via system calls 122. To maintain this received information, queue manager 120 may instantiate a data structure (show as synchronization primitive 118B) corresponding to primitive 118A and may store the received information in this structure. In some embodiments, primitive 118B has a one-to-one correspondence to primitive 118A—accordingly, manager 120 may have multiple primitives 118B if an application 110 has multiple primitives 118A. In the illustrated embodiment, primitive 118B is shown with a dotted line to indicate that primitive 118B may be maintained temporarily. For example, in some embodiment, manager 120 may delete primitive 118B if there are no work items 116 currently enqueue in queues 114 and the application 110 has not requested that the kernel detect occurrences of any events.

As will be described in greater detail below with respect to FIG. 3, synchronization primitive 118B may store various useful information to facilitate queue manager 120's dispatch of threads 132. Most basically, primitive 118 may indicate, in various embodiments, whether an item is enqueued in a queue 114. This information may be beneficial as 1) manager 120 does not need to dispatch a thread 132 to read the contents of queues 114 to determine whether something is enqueued and 2) manager 120 is not dispatching a thread 132 when nothing is enqueued in a queue 114. In some embodiments, primitive 118B includes an identifier of primitive 118A, which manager 120 can provide to a dispatched thread 132 to direct it where to go to acquire primitive 118A and dequeue a work item 116. In some embodiments, primitive 118A includes a highest execution priority associated with an enqueued item 116, which manager 120 may use to determine whether to dispatch a thread 132 and to determine the execution priority at which the thread 132 should be dispatched—thus, manager 120 may not dispatch a lower priority thread 132 to perform a higher priority work item 116. In some embodiments, primitive 118B stores an indication of whether a thread 112 currently holds primitive 118A after synchronously enqueuing a work item 116. Based on this information, manager 120 may instruct a dispatched thread 132 to unblock the thread 112 after performing the work item 116 or may delay dispatching another thread 132 if it would be at a lower execution priority and unable to override primitive 118A. In short, use of primitive 118B in various embodiments may allow the kernel (and more specifically manager 120 in the illustrated embodiment) to have greater insight into what is occurring in user space 102 with respect to queues 114 beyond merely knowing that an application 110 has made a request to dispatch a worker thread 132. Through having this greater insight, in various embodiments, the kernel can make more intelligent decisions on how to process work items 116 and deliver kernel events 126.

Figure 2:
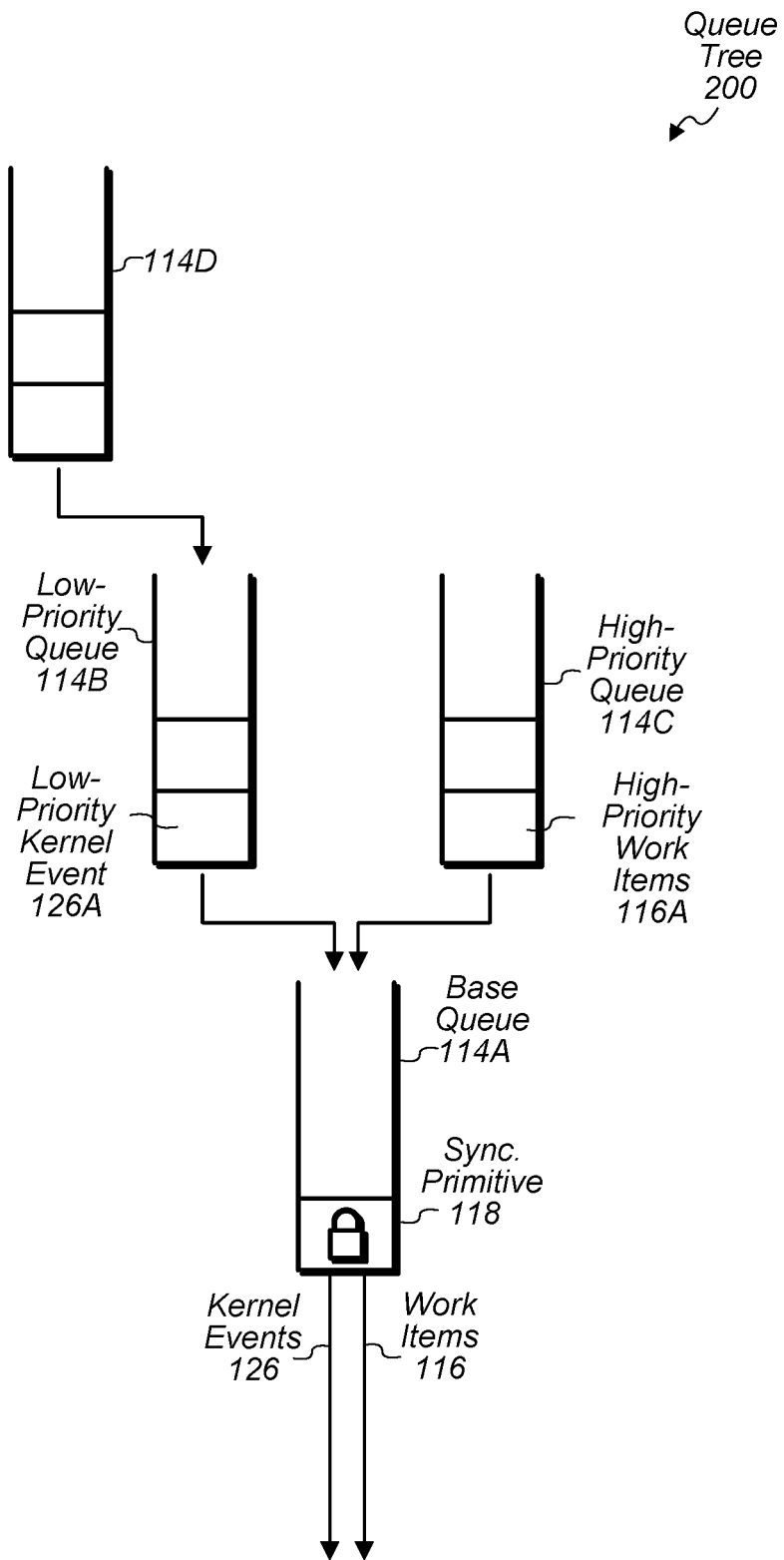
FIG. 2 is a block diagram illustrating an exemplary arrangement for a collection of queues used by the computer system.

Turning now to FIG. 2, a block diagram of a queue tree 200 is depicted. As noted above, in some embodiments, queues 114 are a collection of queues arranged in a manner that also implements a queue. Accordingly, in the illustrated embodiment, this arrangement is depicted as queue tree 200. As shown in FIG. 2, tree 200 may have a base queue 114A that has an input coupled to the outputs of higher-level queues 114B and 114C. These queues 114B and C may also be coupled to even higher-level queues, such as queue 114D, and so forth.

In various embodiments, different higher-level queues 114 are operable to store different types of content. For example, as shown, queue 114B may store kernel events 126, which may be from a specific event source (e.g., another application providing IPCs) or group of sources (e.g., WiFi and cellular network interface cards (NICs) of system 10). Queue 114C may store work items 116, which are enqueued by one or more threads 112. Based on the content being stored, in various embodiment, queues 114 may be associated with different execution priorities. For example, as shown, queue 114C may be a high-priority queue (e.g., because it stores high-priority items 116A from a user-interface thread 112), while queue 114B may be a lower priority queue 114 having lower-priority kernel events 126A.

In such an embodiment, base queue 114A may be a priority queue operable to select elements to output based on their respective priorities. Accordingly, queue 114A may cause higher-priority work items 116A to be dequeued before lower-priority kernel events 126A. In various embodiments, base queue 114 is a serial queue that enqueues or dequeues one element at a time as controlled by synchronization primitive 118A. In controlling base queue 114A in this manner, synchronization primitive 118A may control access to the entire tree 200. In some embodiments, primitive 118A is collocated with base queue 114A, so that the location of base queue 114A can easily be determined based on the location of primitive 118A.

Although not depicted, in some embodiments, kernel queues 124 may be arranged in a similar queue tree 200 in which higher priority kernel events 126 are placed into higher priority queues 124 and lower priority kernel events 126 are placed into lower priority queues 124.

Figure 3:
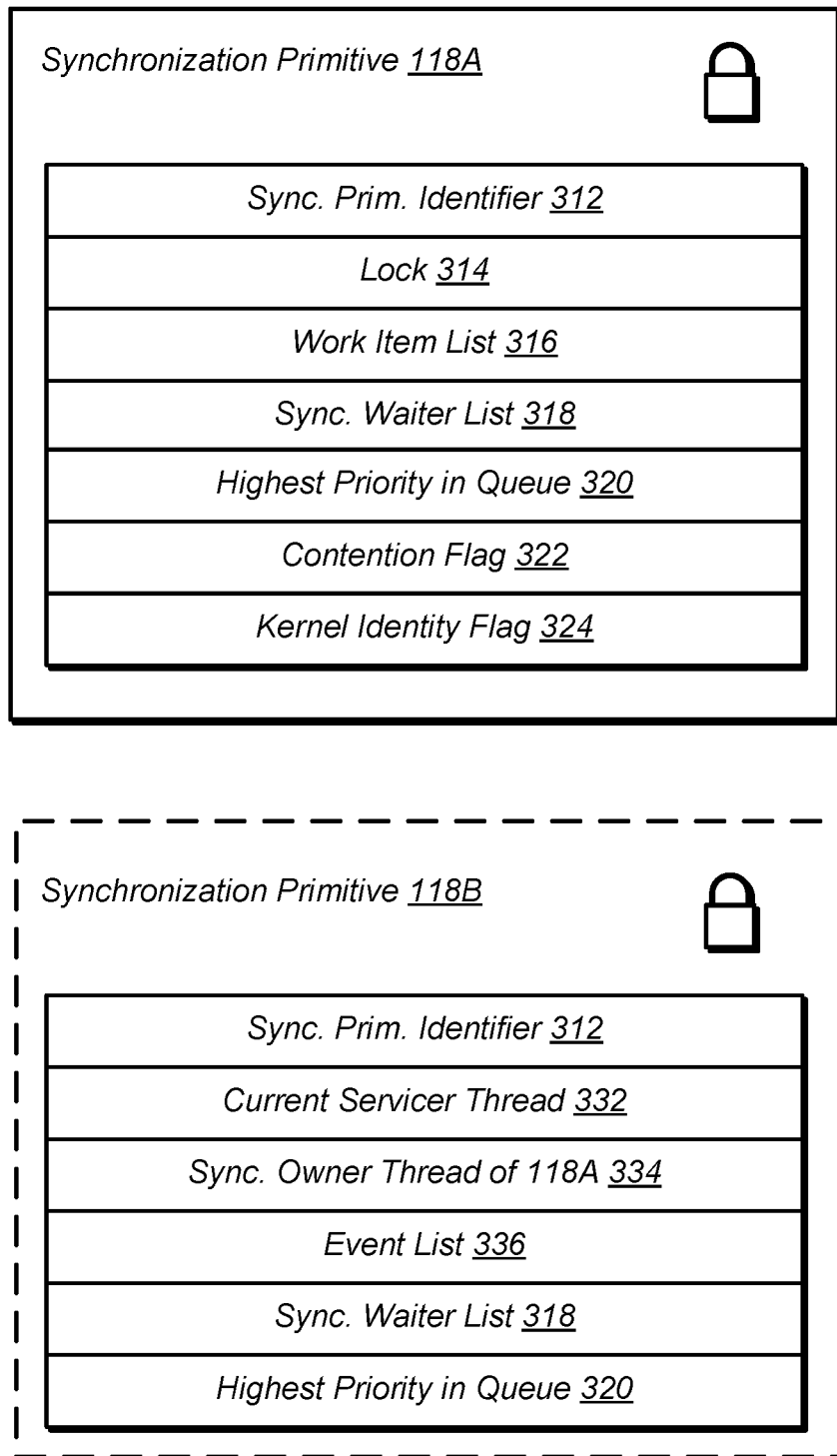
FIG. 3 is a block diagram illustrating an example of a user-space synchronization primitive that controls access to a collection of queues and its corresponding kernel-space synchronization primitive.

Turning now to FIG. 3, a block diagram of synchronization primitives 118A and 118B is depicted. As noted above, in various embodiments, primitives 118A and 118B may store additional information beyond what is used to merely control access to queues 114. Accordingly, in the illustrated embodiment, synchronization primitive 118A includes a synchronization primitive identifier 312, lock 314, work item list 316, synchronization waiter list 318, highest priority 320, contention flag 322, and kernel identity flag 324. Synchronization primitive 118B includes synchronization primitive identifier 312, current servicer thread 332, synchronization owner 334, event list 336, synchronization waiter list 318, and highest priority 320. Notably, primitive 118B includes at least a portion of the information included in primitive 118A. In some embodiments, primitives 118A and 118B may include more (or less) elements than shown in FIG. 3.

Synchronization primitive identifier 312, in one embodiment, is an identifier that uniquely identifies a particular synchronization primitive 118A from other primitives 118A maintained by the same application 110 or other applications 110. In some embodiments, identifier 312 is an address in memory where the primitive 118A is located. As noted above and discussed with FIG. 4B, manager 120 may provide this identifier 312 to a dispatched thread 132 to indicate where thread 132 is to go to acquire primitive 118A (and also locate base queue 114A). As shown, this identifier 312 may also be stored in primitive 118B in order to associate that primitive 118B (and thus the information that it includes) with its corresponding primitive 118A.

Lock 314, in one embodiment, is the specific data structure within primitive 118A that controls access to a collection of queues 114. This data structure may include a Boolean value indicating whether primitive 118A is currently held or available for acquisition. In various embodiments, lock 314 may be read by a thread 112 or 132 attempting to acquire primitive 118A. If primitive 118A is currently available, the thread 112 or 132 may alter the value of lock 314 to indicate that primitive 118A is now held while the thread 112 or 132 enqueues or dequeues elements in queues 114. If primitive 118A is unavailable, the thread 112 or 132 may add itself to synchronization waiter list 318.

Work item list 316, in one embodiment, is a list of work times 116 enqueued in queues 114. In some embodiments, list 316 prioritizes work items 116 based on their respective priorities. In various embodiments, a dispatched thread 132 may read the contents of list 316 to determine metadata about what it is dequeuing.

Synchronization waiter list 318, in one embodiment, is a list of threads 112 or 132 waiting to acquire primitive 118A. As noted above, threads 112 or 132 may be added to list 318 if they are unable to acquire primitive 118A. After a thread 112 or 132 has released primitive 118A, it may examine list 318 to determine who should be contacted to indicate that primitive 118A is available for acquisition. In some embodiments, list 318 indicates a respective execution priority associated with each listed thread 112 or 132. In such an embodiment, the releasing thread 112 or 132 may notify the highest priority thread that primitive 118A is available for acquisition.

Highest priority 320, in one embodiment, indicates the highest execution priority of any element enqueued in a collection of queues 114. In some embodiments, manager 120 may examine the copy of priority 320 in primitive 118B to determine the appropriate execution priority for a thread 132 being dispatched. In some embodiments, a thread 112 enqueuing a work item 116 may examine priority 320 and compare the value of priority 320 with the propriety of the work item 116 being enqueued to determine whether to issue another request for a higher-priority thread 132 because the item 116 being enqueued has a higher priority. In some embodiments, the thread 112 may also determine to not issue a thread request if a previous request was just issued for another pending work item 116 having the same priority (or a lower priority). In some embodiments, priority 320 may be set to a particular value (e.g., −1) if nothing is enqueued to indicate that queues 114 are empty.

Contention flag 322, in one embodiment, indicates whether primitive 118A is contended—i.e., one or more threads 112 or 132 are trying to acquire primitive 118A while it is currently held by another thread 112 or 132. In various embodiments, flag 322 may be set if list 318 is not empty in order to cause a thread 112 or 132 releasing primitive 118A to examine list 318.

Kernel identity flag 324, in one embodiment, indicates whether a corresponding synchronization primitive 118B has been instantiated by manager 120 in kernel space 104.

Current servicer thread 332, in one embodiment, identifies the current thread 132 (or threads 132) dispatched to deliver events 126 and/or perform work items 116. In some embodiments, manager 120 may examine this value 332 to determine whether a thread 132 has already been dispatched (and thus whether to dispatch another thread 132). In some embodiments, this value 332 may also indicate the execution priority at which the thread 132 was dispatched. Accordingly, manager 120 may also determine from this value 332 whether a higher priority thread 132 should be dispatched to service a newly received, higher priority work item 116 or event 126.

Synchronization owner thread 334, in one embodiment, identifies a thread 112 that has enqueued a work item 116 synchronously and still holds/owns primitive 118A. Manager 120 may use this value to determine whether to instruct a thread 132 to unblock an owner thread 112. In some embodiments, this value 334 may also indicate the priority of the owner thread—thus, manager 120 may determine to not issue a thread 132 for some other task if the thread 132 would be at a lower priority and would be unable to override primitive 118A.

Event list 336, in one embodiment, is a list of kernel events 126 in kernel queues 124. In some embodiments, list 336 prioritizes kernel events 126 based on their respective priorities. In various embodiments, manager 120 may read list 336 to determine the execution priority for a thread 132 being dispatched to deliver an event 126; a dispatched thread 132 may read the contents of list 336 to determine what events 126 to deliver to queues 114.

In some embodiments, the primitive 118B may be maintained by a synchronization primitive manager included in queue manager 120 and discussed next with respect to FIGS. 4A and 4B. As the values 312-336 of primitives 118A and 118B are altered they may correspond to various states in finite state machines discussed below with respect to FIGS. 5A and 5B.

Figure 4A:
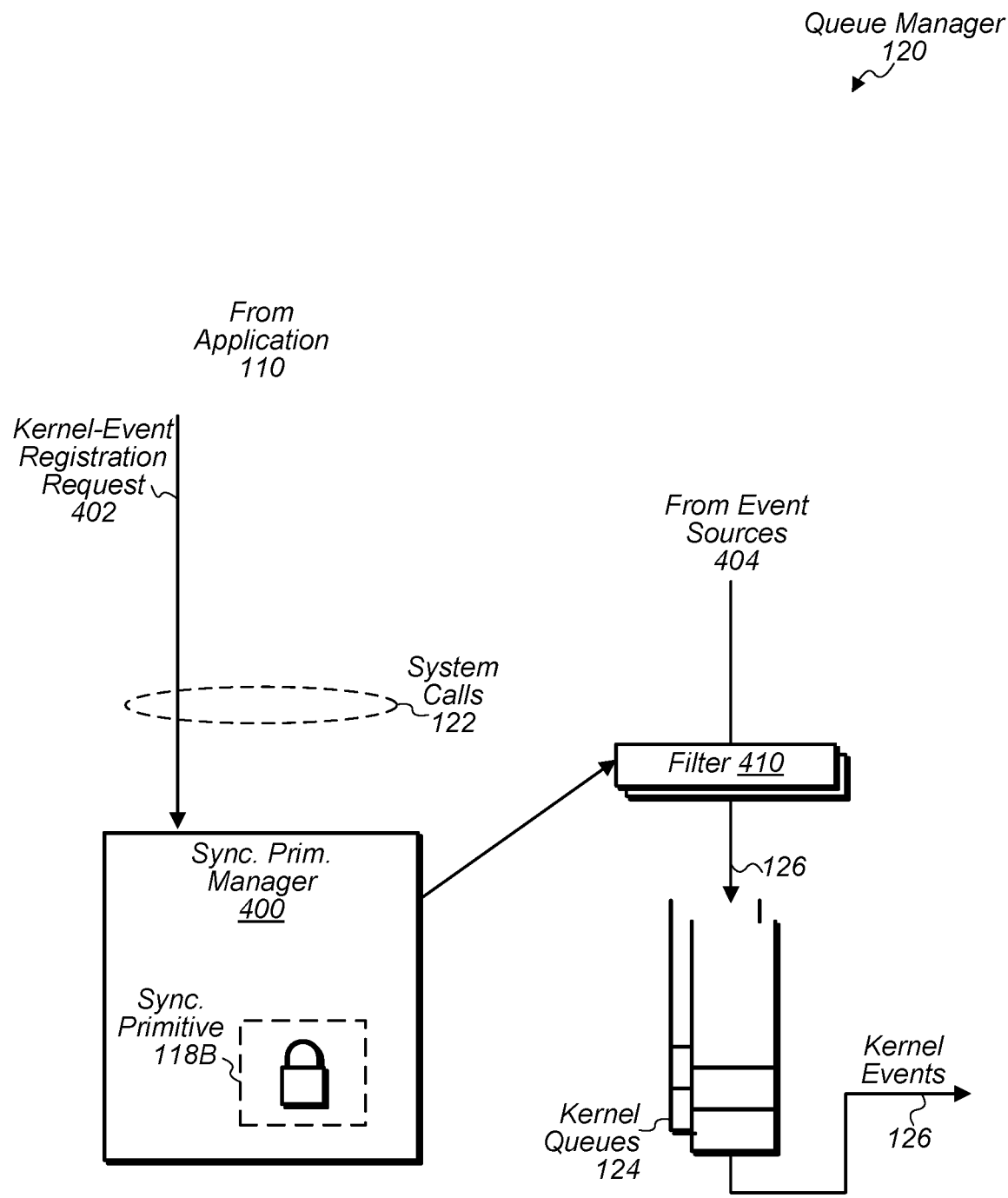
FIGS. 4A and 4B are block diagrams illustrating an example of a synchronization-primitive manager within a kernel space of the computer system.

Turning now to FIG. 4A, a block diagram of a synchronization primitive manager 400 is depicted. In some embodiments, queue manager 120 may include multiple synchronization primitive managers 400, which each maintain a respect primitive 118B. Thus, while various actions may be described herein by manager 400, these actions may be more generally described as being performed by queue manager 120 or the kernel including manager 120. In the illustrated embodiment, manager 400 services a registration request 402. Additional system calls are discussed below with respect to FIG. 4B.

As noted above, an application 110 may submit requests (shown as kernel-event registration request 402) to register for receiving kernel events 126 responsive to the occurrences of particular events. For example, an application may issue request 402 to be receive a kernel event 126 indicating when traffic on a particular TCP/IP port is received. In response to receiving a request 402, manager 400 may instantiate one or more filters 410 that are executable to monitor particular event sources 404 for the registered events and enqueue kernel events 126 in kernel queues 124 for subsequent delivery. For example, manager 400 may create a filter that monitors a NIC. In response to detecting traffic associated with the particular TCP/IP port, the filter 410 may provide information about the detection for inclusion in a kernel event 126. In some embodiments, a request 402 and a filter 410 may correspond to a BSD function call to kevent( ) and a knote, respectively.

Figure 4B:
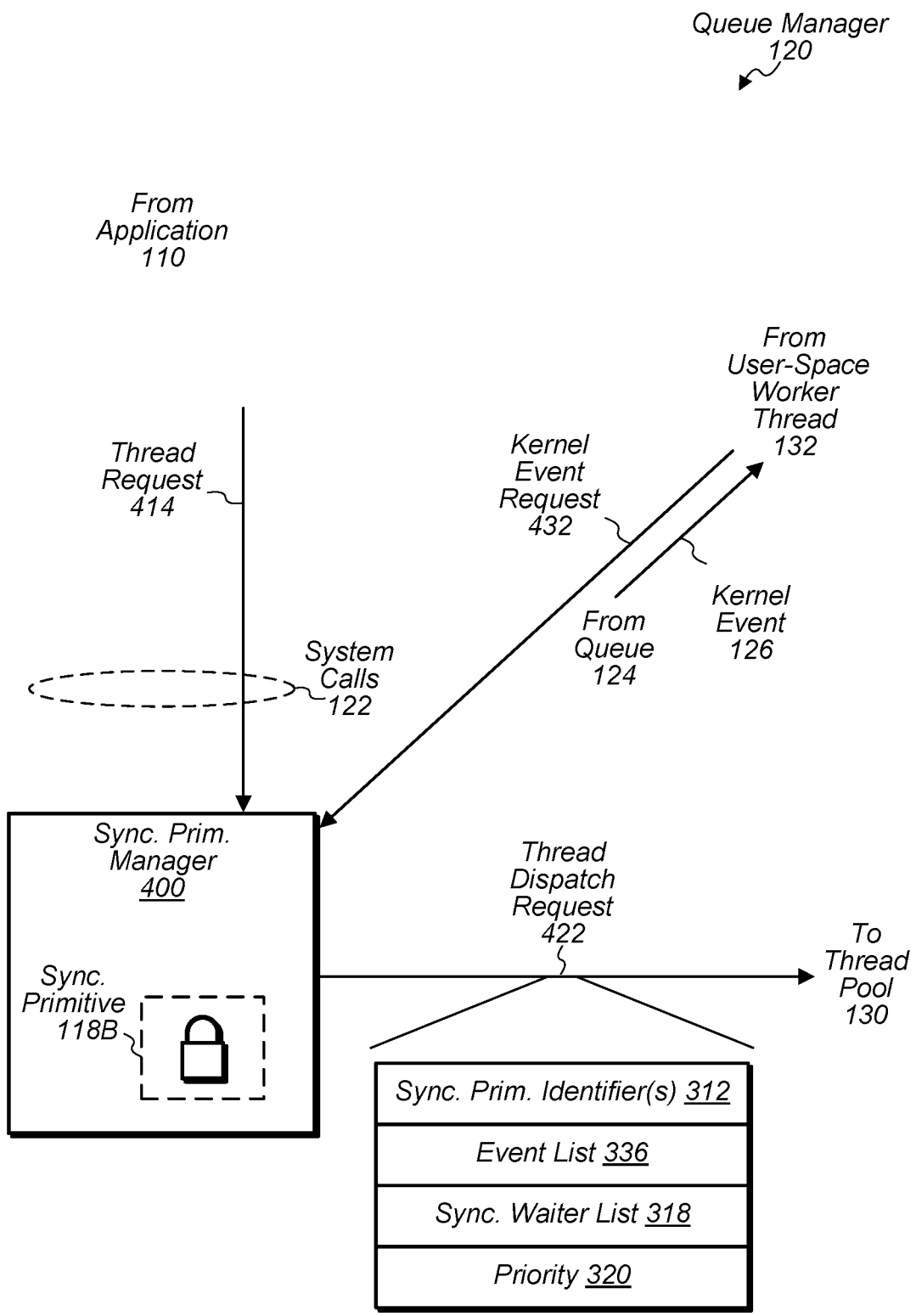

Turning now to FIG. 4B, another block diagram of synchronization primitive manager 400 is depicted. In the illustrated embodiment, manager 400 services thread requests 414.

As noted above, once a thread 112 has enqueued a work item 116, thread 112 may issue a request (shown as a thread request 414) to have a thread 132 dispatched to operate on the work item 116. In some embodiments, this request 414 may include any of the content discussed above with respect to primitive 118A such as an identifier 312, list 318, and priority 320. In response to the receiving a request 414, manager 400 may update primitive 118B based on the included information (or instantiate primitive 118B if it does not currently exist) and determine whether to dispatch a thread 132 responsive to the request 414. As noted above, this determination may be based on whether a previous thread 132 has already been dispatched to service another work item 116 or deliver an event 126, the priority of the new work item 116, the availability of threads 132 in thread pool 130, etc.

If manager 400 does determine to dispatch a thread 132, manager 400 may issue a request 422 to the thread pool 130 to cause a thread 132 to be dispatched. In the illustrated embodiment, this request 422 includes the identifier 312 of the primitive 118A associated with the queue 114 including the item 116, a list 336 of any events 126 to be delivered, a list 318 of any waiting threads 112 to be unblocked responsive to primitive 118A becoming available, and the priority 320 at which the thread 132 is to execute. In some embodiments, request 422 may include more (or less) information—e.g., a request 422 may include multiple identifiers 312 to cause a thread 132 to service multiple queues 114 associated with different primitives 118A of an application 110. In some embodiments, however, a dispatch request 422 may not include the kernel events 126 being delivered; rather, as shown in the illustrated, a worker thread 132 may issue a request 432 once it is in user space 102 to have events 126 provided from queues 124 for delivery to application 110. (Although not depicted, in various embodiments, manager 400 issues similar requests to requests 422 for delivering kernel events 126 when no work items 116 are enqueued.)

Figure 5A:
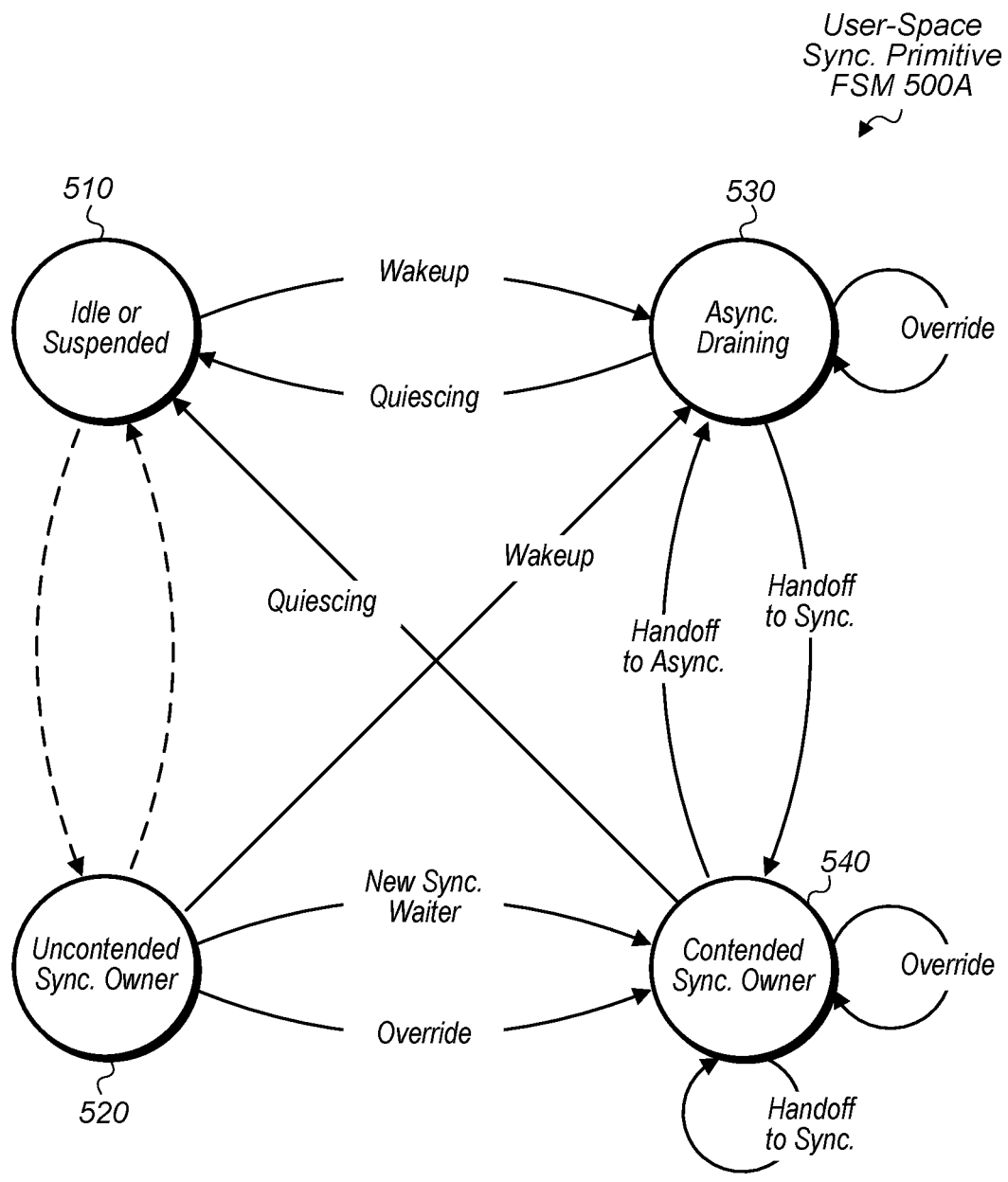
FIGS. 5A and 5B are block diagrams illustrating exemplary finite state machines (FSMs) associated with user-space and kernel-space synchronization primitives.

Turning now to FIG. 5A, a block diagram of a finite state machine (FSM) 500A associated with user-space synchronization primitive 118A is depicted. FSM 500A is one embodiment of an FSM having various states 510-540 associated with the processing of work items 116. In some embodiments, FSM 500A may include more (or less) states than shown.

Idle or suspended state 510, in one embodiment, is an initial state in which no work items 116 or kernel events 126 are enqueued in queues 114. If a thread 112 asynchronously enqueues a work item 116, FSM 500A may transition to state 530 causing the awakening of a manager 400 to dispatch a thread 132. If, however, the thread 112 is synchronously enqueuing a work item 116, FSM 500A proceeds to state 520. Notably, this transition does not trigger a system call 122 in the illustrated embodiment as shown in FIG. 5A. In some embodiments, the transition from state 510 to state 530 (or state 520 to state 530) may cause the instantiation of primitive 118B.

Uncontended synchronous owner state 520, in one embodiment, is a state in which a thread 112 has obtained ownership of primitive 118A in order to obtain mutual exclusion of queues 114 when there is not already an owner of primitive 118A. For example, a thread 112 may acquire primitive 118A for various reasons 116 in order to prevent other threads from dequeuing items 116 and/or events 126. If the thread releases the primitive 118A and there are enqueued asynchronous work items 116, FSM 500A transitions to state 530 causing manager 400 to be awoken to dispatch a thread 132, which can now acquire primitive 118A. If, however, another thread 112 attempts to acquire primitive 118A while primitive 118A is still being held, FSM 500A proceeds to state 540.

Asynchronous draining state 530, in one embodiment, is a state in which a thread 132 has been dispatched to user space 102 and is dequeuing work items 116 for processing. If the work items 116 are successfully performed, FSM 500A may return back to state 510 causing manager 400 to quiescent. If another thread attempts to acquire primitive 118A (i.e., primitive 118A becomes contented), the original thread owner may be overridden until ownership can be handed off when FSM 500A transitions to state 540.

Contended synchronous owner state 540, in one embodiment, is a state in which one or more threads 112 have attempted to acquire primitive 118A while it is held by another thread 112 or 132. As noted above, if the thread 112 or 132 attempting to acquire primitive 118A is a higher-priority thread, the original thread holding primitive 118A may be overridden to expedite handing off of ownership to the new thread requesting ownership. While waiting in state 540, one or more additional threads 112 may attempt to obtain the primitive 118A causing additional overrides and additional threads 112 being added to waiter list 318.

Figure 5B:
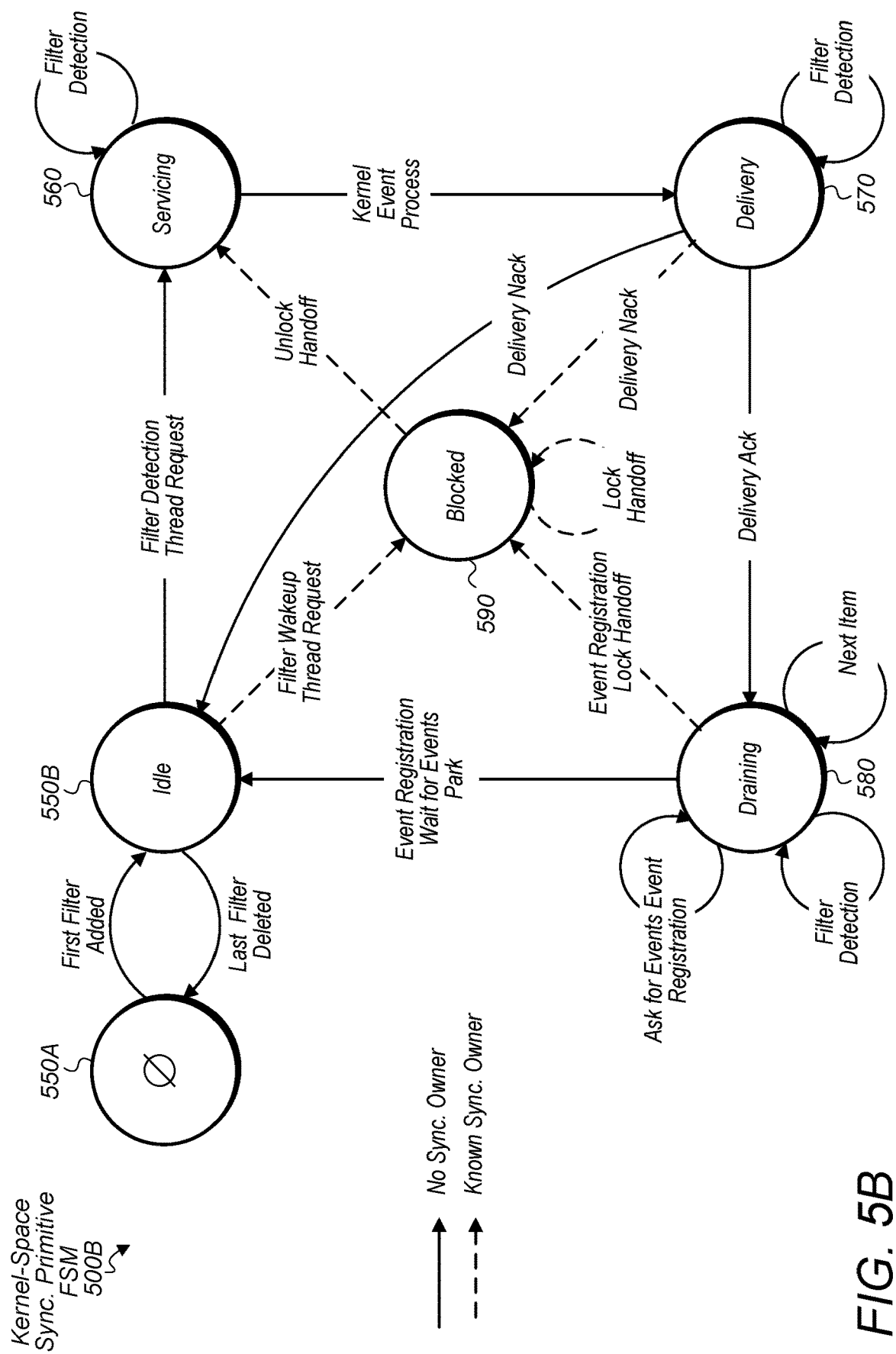

Turning now to FIG. 5B, a block diagram of a finite state machine (FSM) 500B for kernel-space synchronization primitive 118B is depicted. FSM 500B is one embodiment of an FSM having various states 550-590 associated with the delivery of kernel events 126. In some embodiments, FSM 500B may include more (or less) states than shown.

FSM 500B may begin at state 550A in which an application 110 has yet to send a kernel-event registration request 402 asking for the monitoring of an event. In response to a request 402 being issued, manager 400 may add a filter 410 causing FSM 500B to transition to state 550B in which one or more filters 410 are analyzing event sources 404. If the filters 410 are deleted, FSM 500B returns to state 550A. If a filter 410 detects an event or a thread request 414 is received, FSM 500B transitions to state 560.

State 560, in one embodiment, is a state in which a thread 132 has been dispatched to user space 102, but has yet to start delivery of kernel events 126. While at state 560, one or more additional filters 410 may detect events and have kernel events 126 enqueued in kernel queues 124. In response to the thread 132 issuing a kernel-event request 432 and receiving kernel events 126 to be delivered, FSM 500B may transition to state 570.

State 570, in one embodiment, is a state in which a dispatched thread 132 attempts to enqueue received kernel events 126 in queues 114. At the end of enqueuing events 126, the thread 132 may attempt to acquire primitive 118A in order to begin executing enqueued work items 116. If primitive 118A cannot be acquired to start dequeuing items 116, the thread 132 may issue, to manager 120, a negative acknowledgment (Nack) indicating that the transition to state 580 failed, causing FSM 500B to transition to state 590. If the thread 132 is able to acquire the primitive 118A, the thread 132 may issue, to manager 400, an acknowledgement (Ack) to indicate successful delivery, causing FSM 500B to transition to state 580. While at state 570, one or more filters 410 may detect events.

State 580, in one embodiment, is a state in which a thread 132 has delivered kernel events 126 and has now transitioned to dequeuing work items 116/draining queues 114 to perform the work items 116. Once one work item 116 has been completed, thread 132 may return to queues 114 for a next item 116. While at state 580, one or more filters may detect events, and thread 132 may ask for those events 126 to deliver them. A thread 112 may also issue another registration request 402 to monitor for new events. If a thread 132 has successfully completed each item 116 and delivered each event 126, thread 132 may return to pool 130 in kernel space 104, causing FSM 500B to return to state 550B. If, however, a higher priority thread 112 or 132 acquires the primitive 118A (e.g., because a higher priority thread synchronously acquired the primitive before the dispatched thread managed to do so), FSM 500B transitions to state 590.

State 590, in one embodiment, is a state in which the dispatched thread 132 has blocked (or returned to thread pool 130) because it does not have the ability to acquire the contended primitive 118A and dequeue items 116 because primitive 118A is contended. FSM 500B may transition to state 560 if the primitive 118A becomes available to the blocked thread 132.

Figures 6A, 6B:
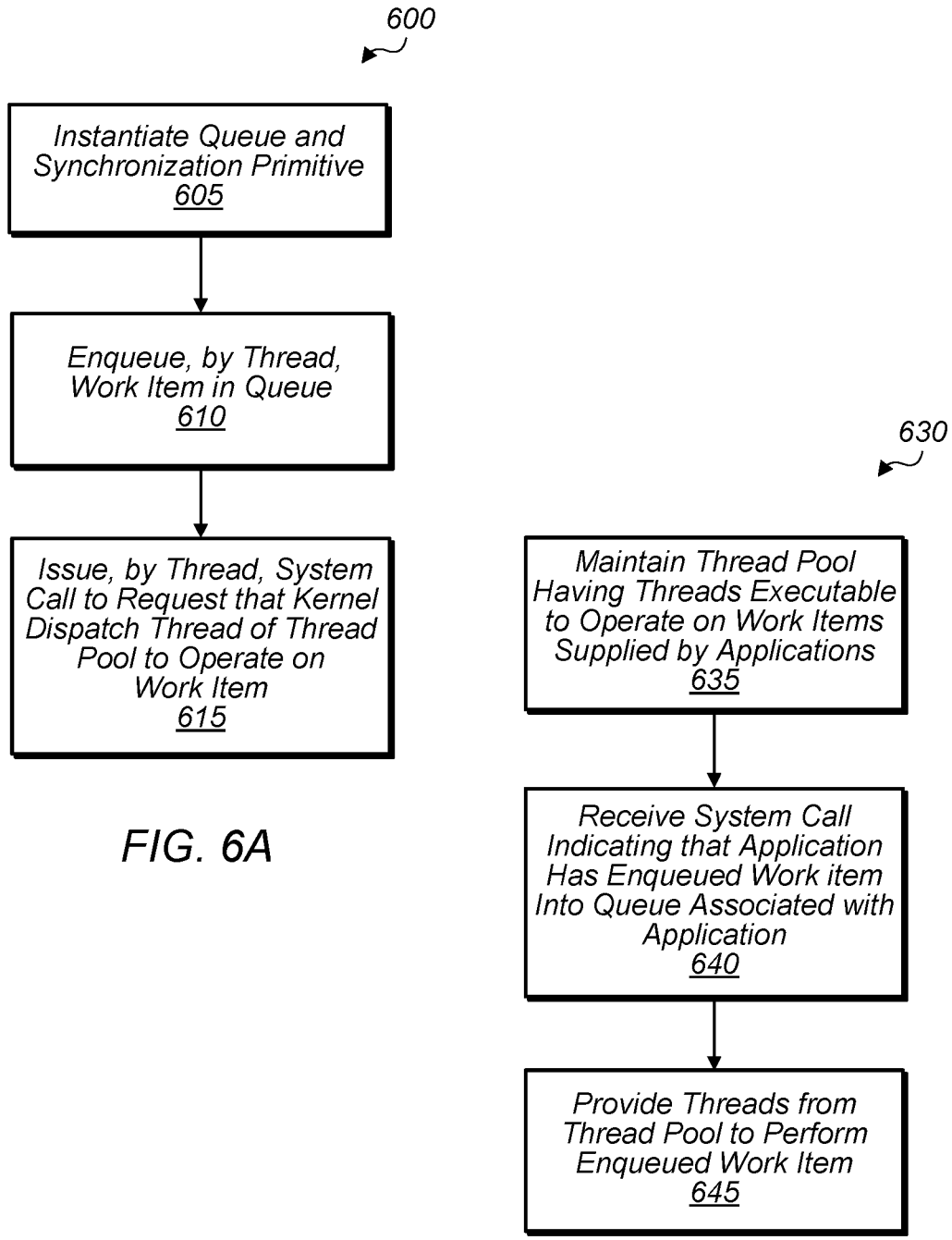
FIGS. 6A-6C are flow diagrams illustrating exemplary methods performed by elements of the computer system.

Turning now to FIG. 6A, a flow diagram of a method 600 is depicted. Method 660 is one embodiment of a method that may be performed by an application executing on a computer system such as application 110. In many instances, performance of method 600 may allow an application to more efficiently perform work items via a thread pool than relying solely on application-spawned threads.

In step 605, an application instantiates a queue (e.g., a queue 114) and a synchronization primitive (e.g., primitive 118A). The queue maintains a set of work items (e.g., items 116) to be operated on by a thread pool (e.g., pool 130) maintained by a kernel (e.g., a kernel including queue manager 120). The synchronization primitive controls access to the queue by a plurality of threads (e.g., threads 112 and 132) including threads of the thread pool. In some embodiments, an input of the queue is operable to receive work items from a plurality of queues associated with different execution priorities (e.g., queues 114B and 114C passing items to queue 114A), and the queue is a priority queue operable to select ones of the received work items based on the different execution priorities.

In step 610, the first thread enqueues a first work item in the queue. In some embodiments, the first thread enqueues the first work item without acquiring the synchronization primitive. In some embodiments, step 610 includes the first thread storing an execution priority of the first work item in the synchronization primitive. In various embodiments, the synchronization primitive stores metadata (e.g., elements 312-324) about work items enqueued in the queue, and the kernel is executable to instantiate a data structure (e.g., primitive 118B) that is accessible to the kernel and that stores, at least, a portion of the metadata (e.g., elements 312, 318, and 320) including the stored execution priority.

In step 615, the first thread issues a system call (e.g., thread request 414) to the kernel to request that the kernel dispatch a thread (e.g., a thread 132) of the thread pool to operate on the first work item. In various embodiments, the dispatched thread is executable to acquire the synchronization primitive, dequeue the first work item from the queue, and operate on the first work item. In some embodiments, the first thread sends an identifier of the synchronization primitive (e.g., identifier 312) to the kernel, which is executable to covey (e.g., via dispatch request 422) the identifier to the dispatched thread to cause the dispatched thread to acquire the synchronization primitive controlling access to the queue and to dequeue the first work item from the queue. In some embodiments, the first thread sends, via the system call, an execution priority (e.g., priority 320) associated with the first work item to the kernel, and the kernel is executable to dispatch the dispatched thread at the execution priority.

In some embodiments, method 600 further includes the application sending, to the kernel, a request (e.g., a registration request 402) to receive a notification about an occurrence of an event, the kernel being executable to detect the occurrence of the event and to provide the notification (e.g., a kernel event 126) to the dispatched thread to cause the dispatched thread to store the notification in the queue. In such an embodiment, a thread of the application retrieves the notification from the queue. In some embodiments, method 600 includes a second thread of the application enqueuing a second work item in the queue, comparing the stored execution priority with an execution priority associated with the second item, and determining, based on the comparing, whether to issue a system call to the kernel to request that the kernel dispatch another thread of the thread pool to operate on the second work item.

Turning now to FIG. 6B, a flow diagram of a method 630 is depicted. Method 630 is one embodiment of a method that may be performed by a kernel such as a kernel including queue manager 120. In many instances, performance of method 630 may allow a kernel to more efficiently manage performance of work items via a thread pool.

In step 635, a kernel maintains a thread pool (e.g., thread pool 130) having a plurality of threads (e.g., threads 132) executable to operate on work items (e.g., work items 116) supplied by a plurality of applications.

In step 640, the kernel receives a first system call (e.g., a thread request 414) indicating that a first of the plurality of applications has enqueued a first work item into a queue (e.g., a queue 114) associated with the first application. In some embodiments, the kernel, in response to the first system call, instantiates a data structure (e.g., primitive 118B) corresponding to the synchronization primitive. In some embodiments, the kernel stores, in the data structure, a priority (e.g., a priority 320) associated with the first work item. In some embodiments, the first system call indicates that a thread of the application has acquired the synchronization primitive and blocked awaiting performance of the first work item.

In step 645, the kernel provides one of the plurality of threads from the thread pool to perform the enqueued first work item, the thread being executable to acquire a synchronization primitive (e.g., primitive 118A) controlling access to the queue prior to dequeuing the first work item and performing the first work item. In some embodiments, the kernel stores an indication (e.g., current servicer thread 332) that the thread has been provided to perform the first work item. In such an embodiment, method 630 may include the kernel receiving a second system call indicating that the first application has enqueued a second work item in the queue and, based on the stored indication, determining whether to provide another thread from the thread pool to perform the second item. In some embodiments, the indication is stored in the data structure instantiated in step 640, and the data structure further includes an address (e.g., identifier 312) of the synchronization primitive. In such an embodiment, the kernel conveys the address to the provided thread to direct the provided thread to dequeue the first work item from the queue. In some embodiments, the determining whether to provide the other thread is based on the stored priority in step 640. In some embodiments, the kernel instructing the provided thread to unblock the thread of the application in response to performing the first work item.

In some embodiments, method 630 includes, prior to providing the thread from the thread pool, the kernel receiving a request to deliver a message to the first application, the message being associated with a priority that is higher than a priority of the first work item, and the kernel providing another thread from the thread pool. In such an embodiment, the other thread is executable to override the synchronization primitive and enqueue the message in the queue. In various embodiments, method 630 includes the kernel receiving, from the first application, a request to be notified in response to an occurrence of an event, and the kernel, in response to determining that the event has occurred, providing another thread from the thread pool to enqueue a notification (e.g., kernel event 126) for the occurrence of the event in the queue. In some embodiments, the queue (e.g., queue tree) comprises a plurality of queues (e.g., queues 114A-C) including a first queue operable to store the first work item and a second queue operable to store the notification of the event.

Figure 6C:
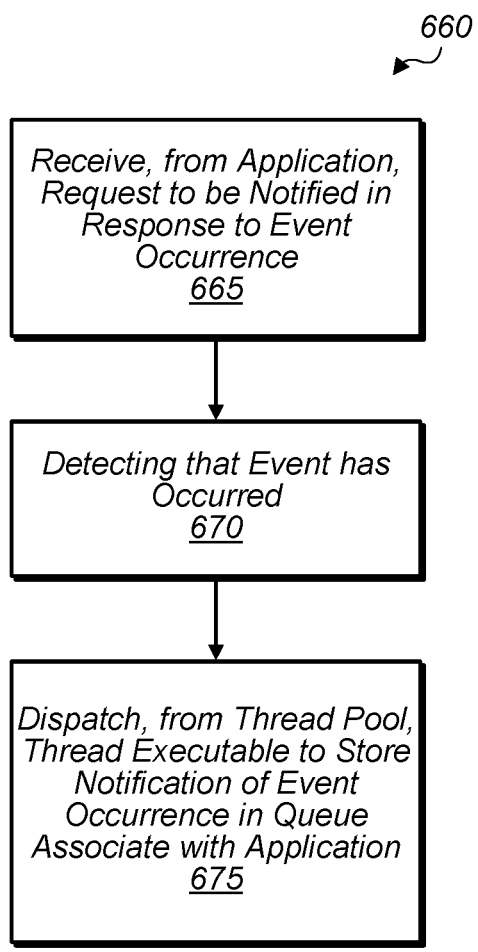

Turning now to FIG. 6C, a flow diagram of a method 660 is depicted. Method 660 is one embodiment of a method that may be performed by a kernel such as a kernel including queue manager 120. In many instances, performance of method 630 may allow a kernel to more efficiently provide notifications to an application.

Method 660 begins in step 665 with a kernel receiving, from a first application (e.g., application 110), a request (e.g., a registration request 402) to be notified in response to an occurrence of an event. In step 670, the kernel detects that the event has occurred (e.g., via a filter 410). In step 675, the kernel dispatches, from a thread pool (e.g., pool 130), a first thread (e.g., thread 132) executable to store a notification (e.g., kernel event 126) of the occurrence of the event in one of a plurality of queues (e.g., queues 114) associated with the first application. In various embodiments, a thread (e.g., thread 112) of the application is executable to retrieve the notification from the queue by acquiring a synchronization primitive (e.g., primitive 118A) that controls access to the plurality of queues.

In some embodiments, method 660 includes the kernel receiving, from the first application, a system call (e.g., a thread request 414) indicating that a thread of the first application has enqueued a work item in one of the plurality of queues. Method 660 further includes the kernel dispatching a second thread from the thread pool, the second thread being executable to acquire the synchronization primitive that controls access to the plurality of queues, retrieve the work item from one of the plurality of queues, and perform the work item for the first application. In some embodiments, the first thread is the second thread. In some embodiments, method 660 includes the kernel receiving a request to deliver a message from a second application to the first application. Method 660 further includes the kernel dispatching, from the thread pool, a second thread executable to store the message in one of the plurality of queues such that a thread of the application is executable to retrieve the stored message.

Thread Execution Priority Management

As noted above, an application may rely on the assistance of one or more additional applications, such as a daemon, to perform various actions. For example, the application may be a mail client that downloads emails from an email server. Instead of managing the Internet Protocol (IP) layer used to download the emails itself, the application may send messages asking another application to formulate the IP packets used to send the download request and to decode the received packets including the emails. An application may also have multiple threads that are associated with different respective execution priorities and that may use the assistance of another application. As will be described in greater detail below, in instances in which a high-priority thread is requesting assistance of a lower priority thread, the high-priority thread, in various embodiments, may obtain a "special" reply port for receiving a reply as well as increasing the priority of the lower priority thread. In some embodiments, the reply port may be temporarily valid such that the reply port is torn down and the elevated execution priority is removed in response to a reply being received via the reply port.

Figure 7A:
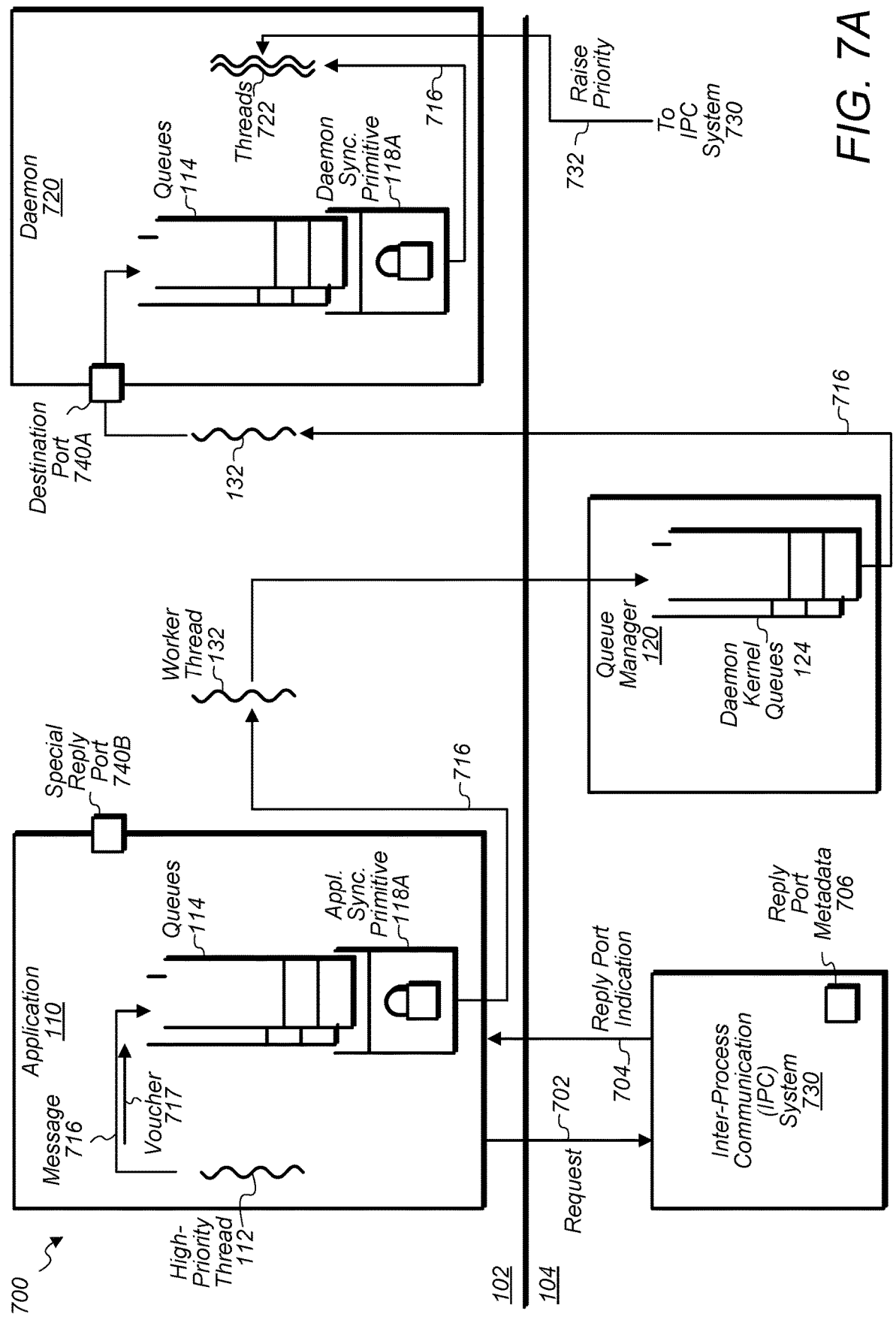
FIGS. 7A and 7B are block diagrams illustrating an example of an inter-process communication within the multi-threaded computer system.

Turning now to FIG. 7A, a block diagram of an inter-process communication 700 is depicted. In the illustrated embodiment, system 10 includes application 110, queue manager 120, daemon 720, and an inter-process communication (IPC) system 730. Application 110 and daemon 720 include respective queues 114 with corresponding synchronization primitives 118A and ports 740. Queue manager 120 includes daemon kernel queues 124. In some embodiments, system 10 may be implemented differently than shown in FIG. 7A. For example, functionality described with respect to manager 120 and IPC system 730 may be implemented by more (or less) elements than shown.

Application 110, in some embodiments, is an application that relies on the assistance of one or more additional applications, such as daemon 720, to perform various actions. As shown, application 110 may include a high-priority thread 112, which may perform important tasks for application 110 and may request the services of another application. For example, in various embodiments, high-priority thread 112 is responsible for rendering the graphical user interface that is interacted with by the user. In some embodiments, thread 112 may also be assigned the highest available execution priority, which, in some embodiments, may be given to threads that interact directly with users such as those maintaining user interfaces. In the illustrated embodiment, high-priority thread 112 may request the assistance of another application by sending an IPC communication (shown as a message 716), which may be conveyed using queues 114, application synchronization primitives 118A, and worker threads 132 discussed above and in greater detail below. Notably, in some embodiments, message 716 may correspond to a form of work item 116 as discussed above with FIGS. 1-6C.

Daemon 720, in various embodiments, is an application executable to perform services, which can be requested by applications 110 via sending messages 716 to destination port 740A. (For this reason, application 110 and daemon 720 may be described has having a client server relationship.) In various embodiments, as shown, daemon 720 performs services concurrently by executing multiple threads 722. In some embodiments, these threads 722 may initially be assigned to a lower execution priority—e.g., an execution priority assigned to background processes. Accordingly, the execution priority of threads 722 may be lower than the execution priority of high-priority thread 112. Similar to application 110, daemon 720 may use queues 114 and a daemon synchronization primitive 118A to facilitate delivery of a message 716 to a thread 722. Queues 114 and primitive 118A may also be used to return a reply discussed in greater detail below with respect to FIG. 7B.

In some circumstances, it may be beneficial to raise the execution priority of a thread 722 in order to expedite performance of a requested service and generation of a corresponding reply. For example, as noted above, high-priority thread 112 may be dependent on the service provided by daemon 720 such that high-priority thread 112 blocks after issuing a message 716 to daemon 720 to wait on a reply from a thread 722. (Communicating a message and blocking in this manner may be referred to below as a "synchronous IPC.") For example, a thread 722 may be providing information that is used in rendering a user interface. Without elevating thread 722's execution priority, high-priority thread 112 becomes effectively relegated to thread 722's lower priority. As will be discussed below, in some embodiments, high-priority thread 112 may enlist the assistance of IPC system 730 to mitigate this problem.

IPC system 730, in various embodiments, is a set of program instructions executable to facilitate inter-process communications. In some embodiments, IPC system 730 is included in an operating system kernel—thus, while various operations may be described herein as being performed by system 730, these operations may also be described more generally as being performed by an operating system kernel. In facilitating inter-process communications, IPC system 730 may instantiate destination ports 740A for directing messages 716 and reply ports 740B for receiving replies. In some embodiments, system 730 may also handle issuance and redemption of vouchers 717 discussed below. (In other embodiments, this may be handled by a separate voucher manager in the kernel or some other element.)

In instances in which high-priority thread 112 is intending to perform a synchronous IPC, high-priority thread 112 may issue a request 702 to IPC system 730 to notify system 730 of its intentions, and to request the creation of a special reply port 740B for conveying execution priority (as opposed to a normal reply port that does not convey execution priority). In response to receiving the request 702, system 730 may instantiate the reply port 740B for receiving a reply to a message 716 and send a reply port indication 704 (e.g., an address/pointer) identifying the reply port 740B to the thread 112. In the illustrated embodiment, port 740B may be instantiated solely for receiving a single reply. That is, upon reception of the reply, system 730 may tear down the reply port 740B. As will be discussed below, in some embodiments, system 730 may also restrict who can make a reply to reply port 740B.

In various embodiments, IPC system 730 is also executable to store metadata 706 to associate reply port 704B with the execution priority of thread 112 in order to convey the execution priority to a recipient thread of a message identifying replying port 740B. In some embodiments, metadata 706 may identify, for example, application 110, high-priority thread 112, thread 112's execution priority, reply port 740B, and/or destination port 740A. In other embodiments, metadata 706 may merely identify reply port 740B and indicate its special status—e.g., that a recipient of a message identifying port 740B is able to obtain an increased execution priority. In various embodiments, metadata 706 is obtained from various sources such as request 702 and/or synchronization primitive 118B (discussed above) corresponding to application synchronization primitive 118A.

After receiving the reply-port indication 704, high-priority thread 112 may include the indication 704 in a message 716 that thread 112 directs to destination port 740A of daemon 720. In some embodiments, thread 112 also includes, in message 716, a voucher 717 that is redeemable in conjunction with reception of reply port 740B to obtain the elevated execution priority of thread 112. In one embodiment, the voucher 717 indicates that IPC system 730 is permitted to alter/unclamp thread 722's execution priority if the thread 722 had been assigned an unchanging/clamped execution priority. The voucher 717 may also be used by thread 722 to transfer an elevated execution priority to another thread assisting thread 722. That is, thread 722 may send the voucher 717 to the other thread, which can redeem the voucher 717 with IPC system 730 in order to obtain the same elevated execution priority. Use of vouchers are described below and in further detail in U.S. application Ser. No. 14/576,692 filed on Dec. 19, 2014 and entitled "METHOD AND APPARATUS FOR INTER PROCESS PRIVILEGE TRANSFER." In some instances, high-priority thread 112 may send message 716 directly to queue manager 120 for storage in a kernel queue 124 associated with daemon 720's destination port 740A (shown as daemon kernel queues 124). In other instances, thread 112 may enqueue the message 716 in a queue 114 in application 110 as shown in FIG. 7A. If another thread 112 already holds primitive 118A, high-priority thread 112 (or the subsequently dispatched worker thread 132) may cause the other thread 112 to be overridden in order to expedite a subsequent dequeuing of message 716. Once message 716 has been enqueued, high-priority thread 112 may issue a thread request 414 (discussed above with FIG. 4B) to request a dispatched thread 132. Because thread 112 has a high execution priority, message 716 may be prioritized in queues 114, and manager 120 may dispatch a thread 132 having the same high priority as high-priority thread 112. As noted above, after sending a request 414 to notify manager 120 of the enqueued message 716, thread 112, in some embodiments, may block awaiting a reply via reply port 740B.

Upon being dispatched, a worker thread 132 may obtain primitive 118A in application 110 and dequeue the message 716 from queues 114 for delivery to daemon kernel queues 124, which may prioritize message 716 because of its high associated execution priority. Responsive to receiving message 716, manager 120 may analyze the contents of message 716 to determine various information for facilitating the delivery of message 716. In various embodiments, this analysis includes identifying the destination port 740A and reply port 740B and determining, based on metadata 706, whether the reply port 740B is associated with an earlier submitted request 702—e.g., whether reply port 740B is a special reply port used to convey execution priority. If the reply port 740B is determined to be associated with an earlier request 702, manager 120 may attempt to identify the thread 722 that will be the recipient of message 716 based on the destination port 740A in order to increase the recipient's execution priority. In particular, manager 120 may identify one of queues 114 in daemon 720 as being with the destination port 740A based on an earlier registration of port 740A (made via a kernel-event registration request 402 discussed with FIG. 4A). Manager 120 may then identify daemon synchronization primitive 118A as controlling access to the queue 114 and determine whether it is held by a thread 722 (e.g., as indicated by a corresponding synchronization primitive 118B as discussed above). If the daemon synchronization primitive 118A is held, manager 120 may identify the thread 722 holding it as the future recipient of message 716.

If manager 120 is able to identify a recipient thread 722, IPC system 730 may increase the execution priority of the thread 722 to the same execution priority assigned to high-priority thread 112. In various embodiments, this increase in execution priority is performed prior to thread 722 receiving message 716. (In other embodiments, however, IPC system 730 may perform the increase upon or after the thread 722 receives message 716.) Manager 120 may also dispatch a thread 132 at the high execution priority to dequeue the message 716 from the kernel queue 124 and deliver the message 716 by enqueuing message 716 in queues 114 in daemon 720. In various embodiments, when message 716 is enqueued in queues 114, the queues 114 may prioritize message 716 such that the next element to be dequeued from queues 114 is message 716. (The enqueuing of message 716 may also elevate the highest priority 320 (discussed above with respect to FIG. 3) of primitive 118A in daemon 720, which may be used to detect a problem as discussed below with FIG. 8A.) Thus, the thread 722 holding daemon synchronization primitive 118A becomes the thread that receives message 716.

If manager 120 is not able to identify a thread 722 (e.g., daemon synchronization primitive 118A is not held), queue manager 120 may dispatch a worker thread 132 from thread pool 130 at thread 112's execution priority. This thread 132 may dequeue the message 716 from queues 124 and become a thread 722 that processes message 716 for daemon 720 at the increased execution priority. In this instance, the thread 132 may not enqueue message 716 in queues 114 and may operate in a similar manner as a worker thread 132 discussed above with respect to FIG. 1-6C.

In some instances, destination port 740A may not yet be associated with daemon 720 and available to receive communications such as message 716. For example, the information used to instantiate destination port 740A may be located within another message received via another port associated with daemon 720 and enqueued in another set of queues 114 (not shown). If a message 716 has been issued to destination port 740A while this other message is still enqueued, in some embodiments, IPC system 730 may elevate the execution priority of a thread that is servicing this other set of queues in order to expedite its instantiation of destination port 740A in order to enable delivery of message 716.

Figure 7B:
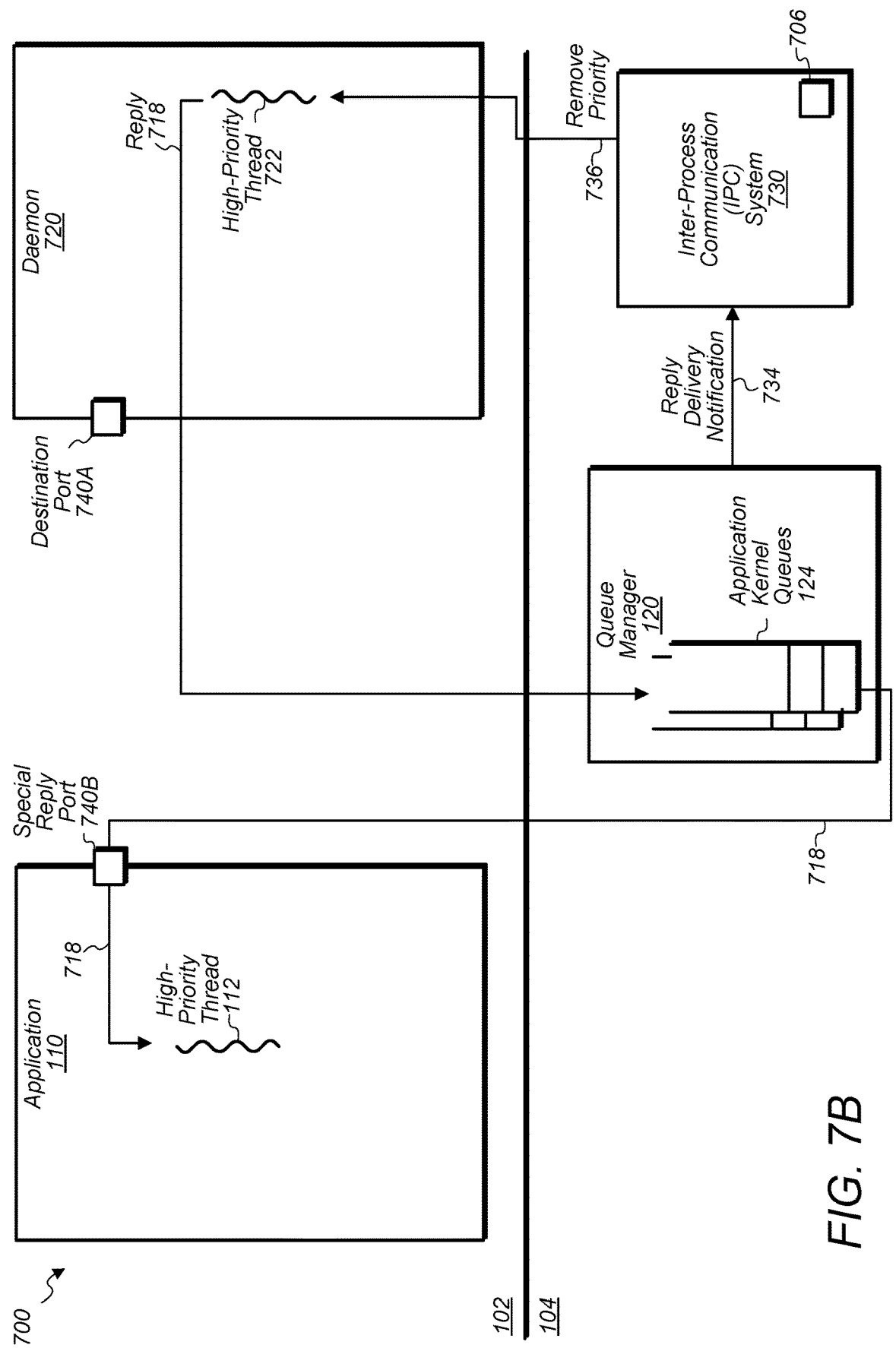

Turning now to FIG. 7B, another block diagram illustrating the return of a reply in inter-process communication 700 is depicted. In some embodiments, IPC 700 may be implemented differently than shown.

In various embodiments, after IPC system 730 has raised the execution priority of the servicing thread 722 (shown as raise priority 732), thread 722 receives scheduling priority from the kernel over other threads in order to more quickly perform the requested service and generate a corresponding reply 718 directed at reply port 740B. In some embodiments, if thread 722 enlists the assistance of another thread (e.g., within daemon 720 or some other application) to provide content for the reply 718, thread 722 may provide voucher 717 included in message 716 to cause that thread to receive an elevated execution priority as well. Once the reply 718 has been generated, in various embodiments, thread 722 delivers the reply 718 directly to queue manager 120, which stores the reply 718 in a queue 124 corresponding to reply port 740B. In other embodiments, thread 722 may alternatively enqueue the reply 718 in queues 114, which may be performed in a similar manner to sending message 716 via queues 114 in application 110 as discussed above.

In some embodiments, responsive to reply 718 being received at a queue 124, manager 120 and/or system 730 may confirm that the reply 718 is permitted to be delivered to reply port 740B. In some embodiments, this confirmation may be performed by verifying the contents of the request 414, metadata 706, and/or the contents of reply 718 as noted above. If the reply 718 is permitted to be transmitted via reply 740B, manager 120 may awake blocked thread 112 and deliver the reply 718 to the thread 112. Manager 120 may also send a notification 734 about reply 718 being delivered to IPC system 730 to make it aware of the reply 718.

As noted above, in some embodiments, IPC system 730 removes the elevated execution priority of thread 722 (shown as remove propriety 736) in response to reply 178 being sent to reply port 740B. In some embodiments, this removal may occur after reply 718 has been successfully delivered to thread 112 (or after a determination that generation and/or delivery of reply 718 is unsuccessful). In other embodiments, different conditions may trigger priority removal. For example, as will be discussed with FIG. 8B, this removal may occur in conjunction with the reply 718 being enqueued in application kernel queues 124. In another embodiment, this removal may alternatively occur in response to daemon thread 722 sending an indication that it has completed generating a reply 718 to IPC system 730. In still another embodiment, this removal may occur in response to thread 112 sending a notification indicating that it has received a reply 718 or no longer wants to receive a reply. As noted above, in some embodiments, IPC system 730 also removes reply port 740B in response to reply 718 being successfully delivered. Accordingly, if a subsequent reply 718 directed to port 740B is sent, the delivery of that message may fail because of the removal.

Figure 8A:
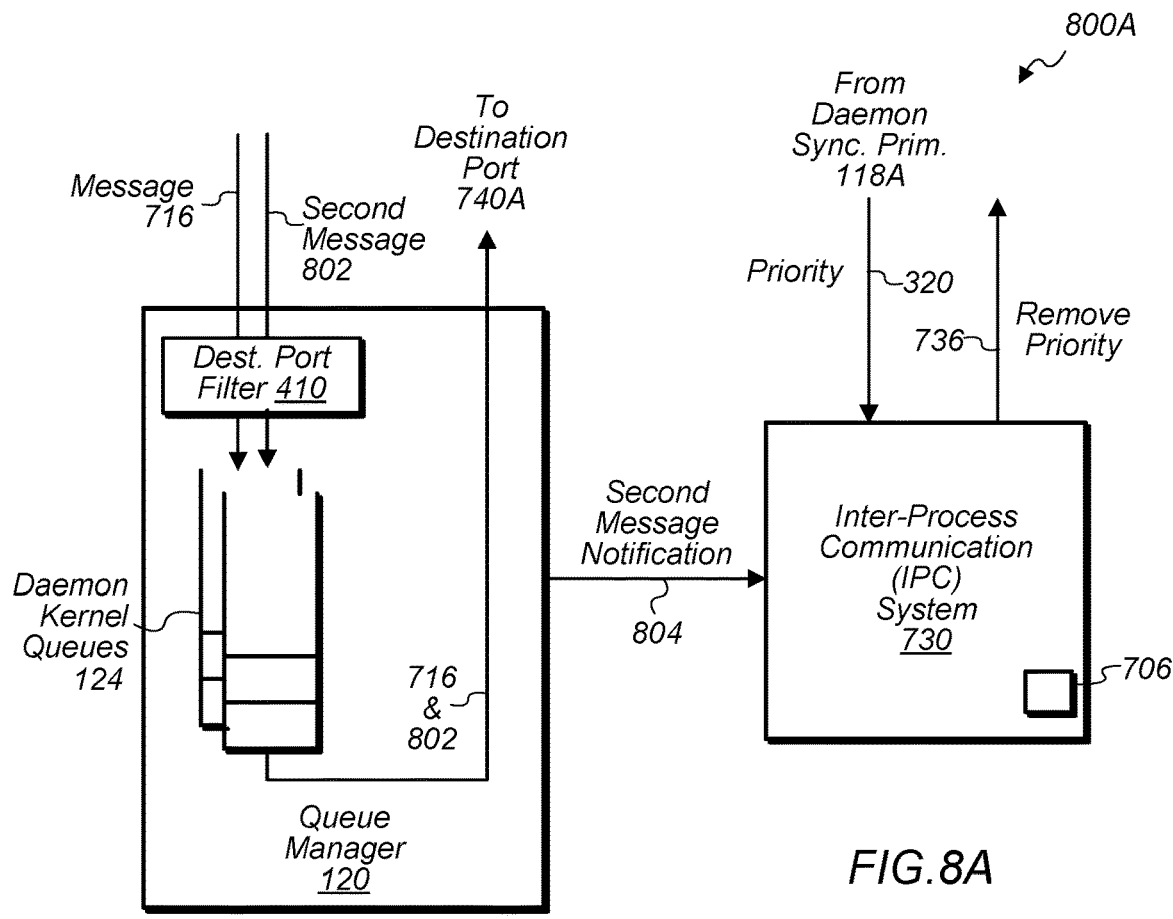
FIGS. 8A and 8B are block diagrams illustrating examples of sending and receiving messages with respect to a queue manager in the kernel.

Turning now to FIG. 8A, a block diagram of an interaction 800A between queue manager 120 and IPC system 730 during the sending of message 716 is depicted.

As noted above, in some embodiments, the delivery of message 716 may be tracked in order to restrict a daemon thread 722 from abusing its elevated execution priority. In the illustrated embodiment, manager 120 may include a destination port filter 410, which may be created responsive to a registration request 402 from daemon 720 to monitor for messages 716 directed to destination port 740A. When message 716 is received, the filter 410 may generate a kernel event 126 including message 716 in queue 124. In some embodiments, manager 120 may notify IPC system 730 about the message 716, and IPC system 730 may record information about the transmission of message 716 in metadata 706.

Destination port filter 410 may continue to monitor for messages directed to port 740A. When filter 410 detects a second, subsequent message 802 directed to port 740A, manager 120 may send a notification 804 about the second message 802 to IPC system 730. In response to receiving notification 804, in some embodiments, IPC 730 determines whether message 716 is still enqueued in queues 114 in daemon 720—meaning that the thread 722 has not yet retrieved the message 716, which may be indicative of a potential problem. In such an embodiment, IPC system 730 is executable to remove thread's 722 elevated execution priority in response to determining that message 716 is still enqueued in one of the queues 114. In the illustrated embodiment, IPC system 730 determines whether message 716 is still enqueued based on the highest priority 320 associated with the synchronization primitive 118A in daemon 720. That is, because message 716 is associated with thread 112's high priority (which may be the highest priority in some embodiments) and its enqueuing raises the value of priority 320, priority 320 remaining at a high priority is an indicator that message 716 has not been dequeued. (As discussed above, in some embodiments, this priority 320 may be determined from a system call 122 and/or a synchronization primitive 118B corresponding to the primitive 118A in daemon 720.)

Figure 8B:
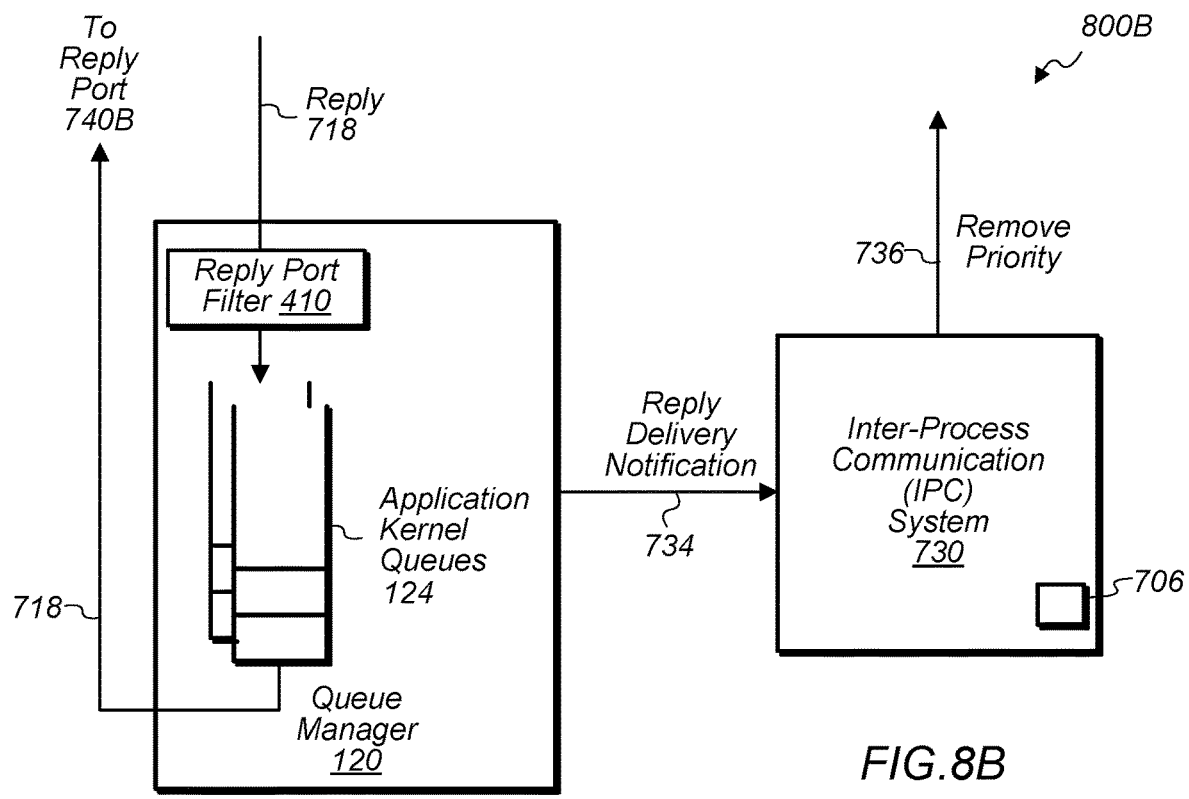

Turning now to FIG. 8B, a block diagram of another interaction 800B between queue manager 120 and IPC system 730 during the sending of reply 718 is depicted. In some embodiments, when reply port 740B is created, a corresponding reply port filter 410 is created to monitor for replies 718 directed to reply port 740B. Accordingly, if a valid reply 718 directed to port 740B is received, reply port filter 410 may create a corresponding kernel event 126 including the reply 718 in queue 124 for subsequent delivery. In the illustrated embodiment, the triggering of filter 410 responsive to a reply 718 may cause manager 120 to send a notification 734 about the reply 718 to IPC system 730. In response to receiving notification 734, IPC system 730 may remove the elevated execution priority of the servicing thread 722.

Figures 9A, 9B:
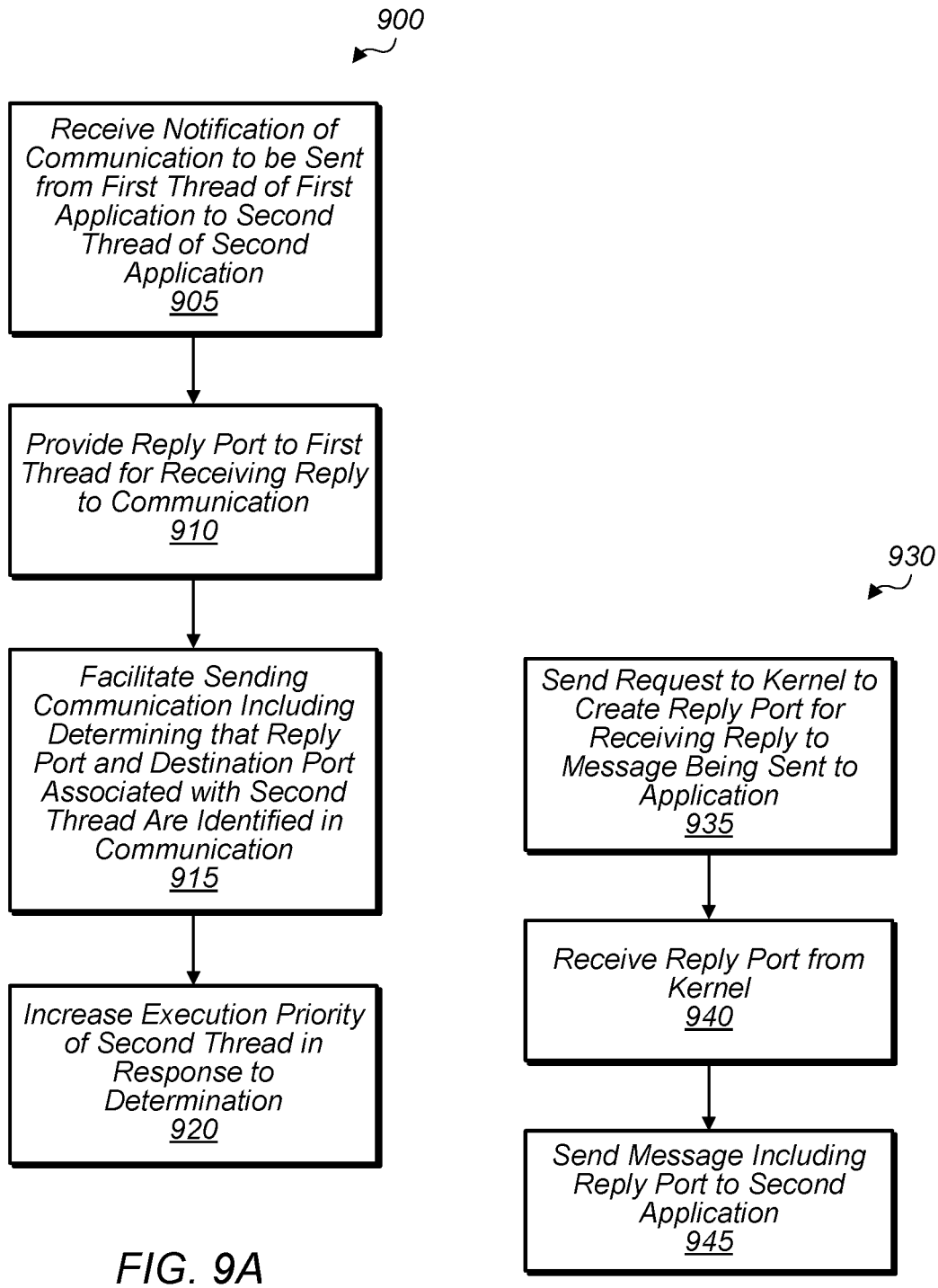
FIGS. 9A-9C are flow diagrams illustrating exemplary methods performed by elements of the computer system.

Turning now to FIG. 9A, a flow diagram of a method 900 is depicted. Method 900 is one embodiment of a method that may be performed by a kernel facilitating an IPC exchange between two threads. In some instances, performance of method 900 may reduce the probably that a higher priority thread of an application is held up awaiting a response from a lower priority thread.

In step 905, a kernel receives a notification (e.g., a request 702) of a communication (e.g., message 716) to be sent from a first thread (e.g., high priority thread 112) of a first application to a second thread (e.g., thread 722) of a second application.

In step 910, the kernel provides a reply port (e.g., reply port 740B) to the first thread for receiving a reply (e.g., reply 718) to the communication from the second thread. In various embodiments, the kernel creates the reply port in response to receiving the notification. In some embodiments, the notification indicates that the first thread has a particular execution priority and is blocking responsive to the communicating being sent. In such an embodiment, in response to the receiving the notification, the kernel associates the reply port with the particular execution priority to cause a recipient of the communication to have the particular execution priority.

In step 915, the kernel facilitates sending the communication from the first thread to the second thread, including determining that the reply port and a destination port (e.g., destination port 740A) associated with the second thread are identified in the communication. In various embodiments, the kernel dispatches a third thread (e.g., worker thread 132) from a thread pool to deliver the communication, the third thread being executable to enqueue the communication in one of a plurality of queues (e.g., queues 114 in daemon 720) associated with the destination port and accessible to the second thread to retrieve the communication. In some embodiments, the kernel identifies the second thread as being associated with the communication based on the second thread holding a synchronization primitive (e.g., daemon synchronization primitive 118A) that controls access to the plurality of queues, and performs step 920 responsive to the identifying. In various embodiments, in response to the communication being sent, the kernel dispatches the second thread to the second application from a thread pool (e.g., thread pool 130) maintained by the kernel. In various embodiments, the first thread is executable to send the communication by enqueuing the communication in one of a plurality of queues (e.g., queues 114 in application 110), and the kernel dispatches a third thread (e.g., worker thread 132) from a thread pool, the third thread being executable to dequeue the communication and facilitate delivery of the communication to the second thread.

In step 920, the kernel increases an execution priority of the second thread in response to the determining. In some embodiments, in response to detecting the reply has been communicated to the reply port, the kernel decreases the execution priority of the second thread and removes the reply port. In some embodiments, the kernel assigns a particular execution priority to one or more threads executable to render a graphical user interface, the first thread being executable to render a graphical user interface for the first application. In such an embodiment, the second thread may be executable to provide, in the reply, information usable to render the graphical user interface for the first application. In some embodiments, subsequent to the third thread enqueuing the communication, the kernel detects another communication (e.g., second communication 802) directed to the destination port. In response to detecting the other communication, the kernel determines whether the communication is still enqueued in one of the plurality of queues, decreases the execution priority of the second thread in response to determining that the communication is still enqueued in one of the plurality of queues.

Turning now to FIG. 9B, a flow diagram of a method 930 is depicted. Method 930 is one embodiment of a method that may be performed by an application sending an IPC such as application 110. In some instances, performance of method 930 may reduce the probably that a higher priority thread of an application is held up awaiting a response from a lower priority thread.

In step 935, a first thread (e.g., thread 112) of a first application sends a request to a kernel to create a reply port (e.g., port 740B) for receiving a reply (e.g., reply 718) to a message (e.g., message 716) being sent to a second application (e.g., daemon 720). In some embodiments, the first thread presents a graphical user interface to a user of the computer system, and the reply from the second thread includes information usable to display the graphical user interface.

In step 940, the first thread receives the reply port (e.g., via indication 704) from the kernel, the reply port being associated with an execution priority of the first thread. In various embodiments, the first thread enqueues the message in a queue (e.g., queue 114) to cause the kernel to dispatch a thread (e.g., a thread 132) from a thread pool to facilitate delivery of the message to the second application. In such an embodiment, the dispatched thread is executable to acquire a synchronization primitive controlling access to the queue by a plurality of threads including the dispatched thread. In some embodiments, the enqueuing includes the first thread causing another thread that holds the synchronization primitive to be overridden. In such an embodiment, the queue (e.g., queue tree 200) is operable to prioritize the enqueued message based on an execution priority of the first thread. In some embodiments, the first thread inserts a voucher into the message, the voucher being redeemable by a recipient to obtain the execution priority of the first thread.

In step 945, the first thread sending the message including the reply port to the second application to cause a second thread of the second application to execute at the execution priority of the first thread when generating the reply to the message. In various embodiments, the first thread suspends execution until the reply is received via the reply port. In various embodiments, the first thread then receives the reply from the second thread via the reply port, the kernel is executable to reduce the execution priority of the second thread in response to the first thread receiving the reply via the reply port.

Figure 9C:
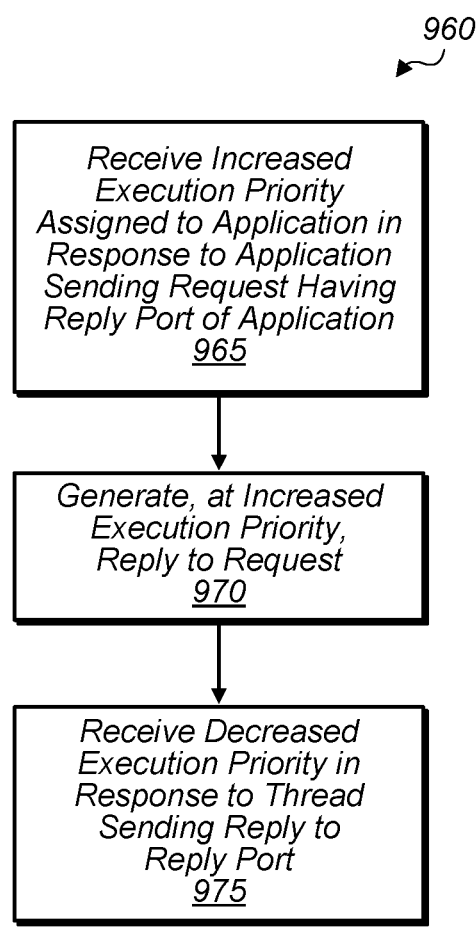

Turning now to FIG. 9C, a flow diagram of a method 960 is depicted. Method 960 is one embodiment of a method that may be performed by an application processing an IPC such as daemon 720. In some instances, performance of method 960 may reduce the probably that a higher priority thread of an application is held up awaiting a response from a lower priority thread.

In step 965, a thread (e.g., thread 722) of a daemon receives an increased execution priority assigned to an application (e.g., application 110) in response to the application sending, to the daemon, a request (e.g., message 716) directed to a destination port (e.g., port 740A) of the daemon and having a reply port (e.g., port 740B) of the application. In various embodiments, the reply port is associated with the assigned execution priority such that a kernel (e.g., including manager 120 and IPC system 730) is executable to supply the increased execution priority to the thread in response to detecting that the request identifies the reply port. In various embodiments, a thread (e.g., thread 112) of the application generates the request and blocks awaiting the reply via the reply port. The thread of the application instructs (e.g., via request 702) the kernel to associate the reply port with an execution priority of thread of the application to cause the thread of the daemon to receive the same execution priority as the thread of the application.

In step 970, the thread generates, at the increased execution priority, a reply (e.g., reply 718) to the request. In some embodiments, step 970 includes generating information, included in the reply, that is usable by a thread of the application to provide a graphical user interface of a computer system. In some embodiments, the thread dequeues the request from one of a plurality of queues (e.g., queues 114 in daemon 720) associated with the daemon. In such an embodiment, the kernel is executable to dispatch a thread (e.g., worker thread 132) from a thread pool to deliver the request by enqueuing the request in one of the plurality of queues. In some embodiments, the thread of the daemon acquires a synchronization primitive that controls access to the queue, and receives the increased execution priority in response to the acquiring and the request identifying a destination port associated with the queue.

In step 975, the thread receives a decreased execution priority in response to the thread sending the reply to the reply port.

Exemplary Computer System

Figure 10:
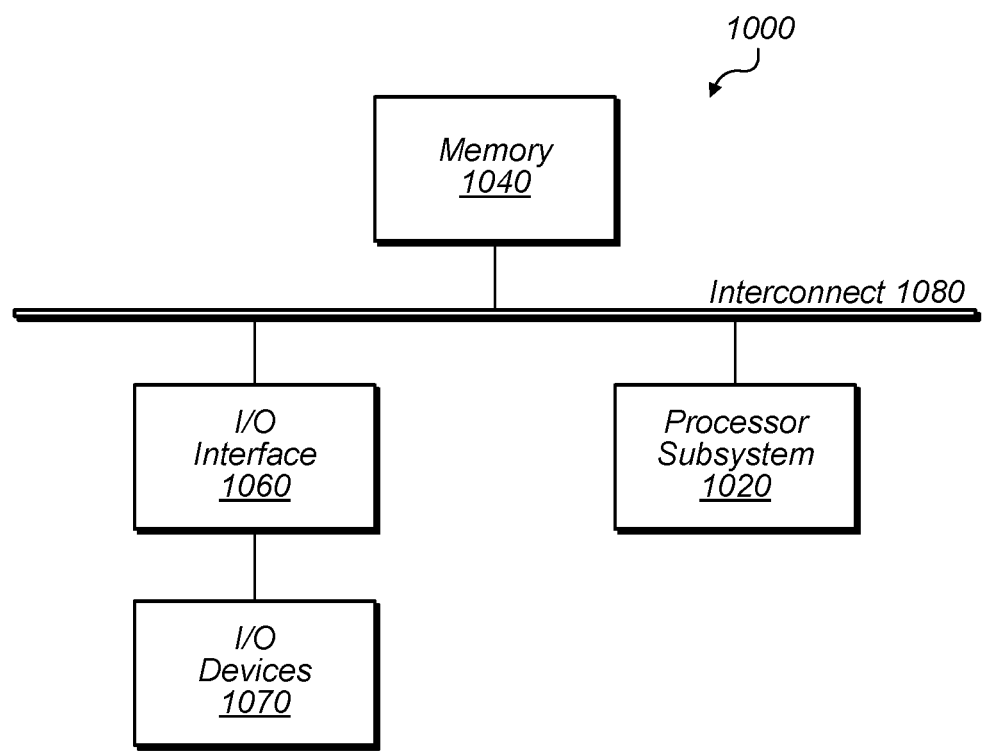
FIG. 10 is a block diagram illustrating one embodiment of an exemplary computer system.

Turning now to FIG. 10, a block diagram of an exemplary computer system 1000 is depicted. Computer system 1000 is one embodiment of a computer system that may be used to implement computer system 10. In the illustrated embodiment, computer system 1000 includes a processor subsystem 1020 that is coupled to a system memory 1040 and I/O interfaces(s) 1060 via an interconnect 1080 (e.g., a system bus). I/O interface(s) 1060 is coupled to one or more I/O devices 1070. Computer system 1000 may be any of various types of devices, including, but not limited to, a server system, personal computer system, network computer, an embedded system, etc. Although a single computer system 1000 is shown in FIG. 10 for convenience, system 1000 may also be implemented as two or more computer systems operating together.

Processor subsystem 1020 may include one or more processors or processing units configured to execute program instructions to perform functionality described herein. In various embodiments of computer system 1000, multiple instances of processor subsystem 1020 may be coupled to interconnect 1080. In various embodiments, processor subsystem 1020 (or each processor unit within 1020) may contain a cache or other form of on-board memory.

System memory 1040 is usable store program instructions executable by processor subsystem 1020 to cause system 1000 perform various operations described herein. For example, memory 1040 more store program instructions to implement application 110, queue manager 120, thread pool 130, daemon 720, and/or IPC system 730. System memory 1040 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 1000 is not limited to primary storage such as memory 1040. Rather, computer system 1000 may also include other forms of storage such as cache memory in processor subsystem 1020 and secondary storage on I/O Devices 1070 (e.g., a hard drive, storage array, etc.). In some embodiments, these other forms of storage may also store program instructions executable by processor subsystem 1020 to perform operations described herein.

I/O interfaces 1060 may be any of various types of interfaces configured to couple to and communicate with other devices, according to various embodiments. In one embodiment, I/O interface 1060 is a bridge chip (e.g., Southbridge) from a front-side to one or more back-side buses. I/O interfaces 1060 may be coupled to one or more I/O devices 1070 via one or more corresponding buses or other interfaces. Examples of I/O devices 1070 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1000 is coupled to a network via a network interface device 1070 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer readable medium having program instructions stored therein, wherein the program instructions are executable by a computer system to cause the computer system to perform operations comprising:

receiving, at a kernel, a notification of a communication to be sent from a first thread of a first application to a second thread of a second application;

providing, by the kernel, a reply port to the first thread for receiving a reply to the communication from the second thread, wherein the reply port is associated with an execution priority;

facilitating, by the kernel, sending the communication from the first thread to the second thread, including determining that the reply port and a destination port associated with the second thread are identified in the communication; and in response to determining that the reply port and the destination port are identified in the communication, increasing, by the kernel, an execution priority of the second thread to the execution priority associated with the reply port.

2. The computer readable medium of claim 1, wherein the operations further comprise:

creating, by the kernel, the reply port in response to receiving the notification;

in response to detecting the reply has been communicated to the reply port:

decreasing, by the kernel, the execution priority of the second thread; and removing, by the kernel, the reply port.

3. The computer readable medium of claim 1, wherein the notification indicates that the first thread has a particular execution priority and is blocking responsive to the communication being sent; and wherein the operations further comprise:

in response to receiving the notification, associating, by the kernel, the reply port with the particular execution priority to cause a recipient of the communication to have the particular execution priority, wherein the increasing includes increasing the execution priority of the second thread to the particular execution priority.

4. The computer readable medium of claim 3, wherein the operations further comprise:

assigning, by the kernel, the particular execution priority to one or more threads executable to render a graphical user interface, wherein the first thread is executable to render a graphical user interface for the first application, and wherein the second thread is executable to provide, in the reply, information usable to render the graphical user interface for the first application.

5. The computer readable medium of claim 1, wherein the facilitating includes:

dispatching, by the kernel, a third thread from a thread pool to deliver the communication, wherein the third thread is executable to enqueue the communication in one of a plurality of queues associated with the destination port and accessible to the second thread to retrieve the communication.

6. The computer readable medium of claim 5, wherein the operations further comprise:

identifying, by the kernel, the second thread as being associated with the communication based on the second thread holding a synchronization primitive that controls access to the plurality of queues, and wherein the increasing is performed responsive to the identifying.

7. The computer readable medium of claim 5, wherein the operations further comprise:

subsequent to the third thread enqueuing the communication, detecting, by the kernel, another communication directed to the destination port; and in response to detecting the other communication, determining, by the kernel, whether the communication is still enqueued in one of the plurality of queues, wherein the kernel decreases the execution priority of the second thread in response to determining that the communication is still enqueued in one of the plurality of queues.

8. The computer readable medium of claim 1, wherein the operations further comprise:

in response to the communication being sent, dispatching, by the kernel, the second thread to the second application from a thread pool maintained by the kernel.

9. The computer readable medium of claim 1, wherein the first thread is executable to send the communication by enqueuing the communication in one of a plurality of queues; and wherein the facilitating includes:

dispatching, by the kernel, a third thread from a thread pool, wherein the third thread is executable to dequeue the communication and facilitate delivery of the communication to the second thread.

10. A non-transitory computer readable medium having program instructions stored therein, wherein the program instructions are executable by a computer system to cause the computer system to perform operations comprising: sending, by a first thread of a first application, a request to a kernel to create a reply port for receiving a reply to a message being sent to a second application having a destination port; receiving, by the first thread, the reply port from the kernel, wherein the reply port is associated with an execution priority of the first thread; and sending, by the first thread, the message including the reply port and the destination port to the second application, wherein the kernel is executable to cause, in response to determining that the reply port and the destination port are included in the message, a second thread of the second application to execute at the execution priority associated with the reply port when generating the reply to the message.

11. The computer readable medium of claim 10, wherein the operations further comprise:

suspending, by the first thread, execution until the reply is received via the reply port; and receiving, by the first thread, the reply from the second thread via the reply port, wherein the kernel is executable to reduce the execution priority of the second thread in response to the first thread receiving the reply via the reply port.

12. The computer readable medium of claim 11, wherein the operations further comprise:

presenting, by the first thread, a graphical user interface to a user of the computer system, and wherein the reply from the second thread includes information usable to display the graphical user interface.

13. The computer readable medium of claim 10, wherein the sending of the message includes:

enqueuing, by the first thread, the message in a queue to cause the kernel to dispatch a thread from a thread pool to facilitate delivery of the message to the second application, wherein the dispatched thread is executable to acquire a synchronization primitive controlling access to the queue by a plurality of threads including the dispatched thread.

14. The computer readable medium of claim 13, wherein the enqueuing includes the first thread causing another thread that holds the synchronization primitive to be overridden; and wherein the queue is operable to prioritize the enqueued message based on an execution priority of the first thread.

15. The computer readable medium of claim 10, wherein the operations further comprise:

inserting, by the first thread, a voucher into the message, wherein the voucher is redeemable by a recipient to obtain the execution priority of the first thread.

16. A method, comprising: receiving, by a thread of a daemon, an increased execution priority assigned to an application in response to the application sending, to the daemon, a request directed to a destination port of the daemon and having a reply port of the application, wherein the reply port is associated with the assigned execution priority such that a kernel is executable to supply the increased execution priority to the thread in response to detecting that the request identifies the reply port and the destination port; generating, by the thread and at the increased execution priority, a reply to the request; and receiving, by the thread, a decreased execution priority in response to the thread sending the reply to the reply port.

17. The method of claim 16, wherein a thread of the application generates the request and blocks awaiting the reply via the reply port, wherein the thread of the application instructs the kernel to associate the reply port with an execution priority of thread of the application to cause the thread of the daemon to receive the same execution priority as the thread of the application.

18. The method of claim 16, wherein the generating includes generating information included in the reply, wherein the information is usable by a thread of the application to provide a graphical user interface of a computer system.

19. The method of claim 16, further comprising:

dequeuing, by the thread, the request from one of a plurality of queues associated with the daemon, wherein the kernel is executable to dispatch a thread from a thread pool to deliver the request by enqueuing the request in one of the plurality of queues.

20. The method of claim 19, further comprises:

acquiring, by the thread of the daemon, a synchronization primitive that controls access to the queue, wherein the thread of the daemon receives the increased execution priority in response to the acquiring and the request identifying a destination port associated with the queue.

* * * * *